United States Patent
Tseng et al.

(10) Patent No.: US 12,309,680 B2
(45) Date of Patent: May 20, 2025

(54) PUBLIC WARNING SYSTEM MESSAGING IN PRIVATE AND PUBLIC NETWORKS

(71) Applicant: SHARP KABUSHIKI KAISHA, Sakai (JP)

(72) Inventors: Yung-Lan Tseng, Taipei (TW); Mei-Ju Shih, Taipei (TW); Hung-Chen Chen, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 467 days.

(21) Appl. No.: 17/735,898

(22) Filed: May 3, 2022

(65) Prior Publication Data

US 2022/0360962 A1 Nov. 10, 2022

Related U.S. Application Data

(60) Provisional application No. 63/186,763, filed on May 10, 2021, provisional application No. 63/184,022, filed on May 4, 2021.

(51) Int. Cl.
*H04M 11/04* (2006.01)
*H04W 4/90* (2018.01)
*H04W 8/18* (2009.01)

(52) U.S. Cl.
CPC ............... *H04W 4/90* (2018.02); *H04W 8/18* (2013.01)

(58) Field of Classification Search
CPC ......... H04W 4/90; H04W 8/18; H04W 88/10; H04W 84/105; H04W 8/183
USPC ...................................................... 455/404.1
See application file for complete search history.

(56) References Cited

U.S. PATENT DOCUMENTS

| | | | | |
|---|---|---|---|---|
| 2020/0351821 | A1* | 11/2020 | Wang | H04W 68/02 |
| 2023/0084683 | A1* | 3/2023 | Chun | H04W 48/18 |
| | | | | 455/434 |

OTHER PUBLICATIONS

IP.com search (Year: 2024).*
ProQuest search (Dialog) (Year: 2024).*
3GPP TS 38.304, "3rd Generation Partnership Project; Technical Specification Group Radio Access Network; NR; User Equipment (UE) procedures in Idle mode and RRC Inactive state (Release 16)", V16.4.0 (Mar. 2021).
3GPP TS 38.133, "3rd Generation Partnership Project; Technical Specification Group Radio Access Network; NR; Requirements for support of radio resource management (Release 17)", V17.1.0 (Mar. 2021).
3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 16)", V16.4.0 (Mar. 2021).
3GPP TS 38.213, "3rd Generation Partnership Project; Technical Specification Group Radio Access Network; NR; Physical layer procedures for control (Release 16)", V16.5.0 (Mar. 2021).

(Continued)

*Primary Examiner* — Moustapha Diaby
(74) *Attorney, Agent, or Firm* — ScienBiziP, P.C.

(57) ABSTRACT

A method for a user equipment (UE) for receiving a public warning system (PWS) message is provided. The method receives, via a first serving cell or a higher layer of the UE, a configuration for warning message reception that is associated with a first network. The method receives the PWS message from a second network that is supported by a second serving cell. The method then determines, based on the received configuration, whether to accept the PWS message or to ignore the PWS message.

18 Claims, 7 Drawing Sheets

(56) References Cited

OTHER PUBLICATIONS

3GPP TS 38.215, "3rd Generation Partnership Project; Technical Specification Group Radio Access Network; NR; Physical layer measurements (Release 16)", V16.4.0 (Dec. 2020).

3GPP TS 38.331, "3rd Generation Partnership Project; Technical Specification Group Radio Access Network; NR; Radio Resource Control (RRC) protocol specification (Release 16)", V16.4.1 (Mar. 2021).

3GPP TS 36.304, "3rd Generation Partnership Project; Technical Specification Group Radio Access Network; Evolved Universal Terrestrial Radio Access (E-UTRA); User Equipment (UE) procedures in idle mode (Release 16)", V16.3.0 (Dec. 2020).

3GPP TS 22.168, "3rd Generation Partnership Project; Technical Specification Group Services and System Aspects; Earthquake and Tsunami Warning System (ETWS) requirements; Stage 1 (Release 9)", V9.0.0 (Jun. 2008).

3GPP TS 23.501, "3rd Generation Partnership Project; Technical Specification Group Services and System Aspects; System architecture for the 5G System (5GS); Stage 2 (Release 17)", V17.0.0 (Mar. 2021).

3GPP TS 22.261, "3rd Generation Partnership Project; Technical Specification Group Services and System Aspects; Service requirements for the 5G system; Stage 1 (Release 17)", V17.6.0 (Mar. 2021).

3GPP TR 21.905, "3rd Generation Partnership Project; Technical Specification Group Services and System Aspects; Vocabulary for 3GPP Specifications (Release 16)", V16.0.0 (Jun. 2019).

3GPP TS 22.268, "3rd Generation Partnership Project; Technical Specification Group Services and System Aspects; Public Warning System (PWS) requirements (Release 16)", V16.4.0 (Sep. 2020).

3GPP TS 23.122, "3rd Generation Partnership Project; Technical Specification Group Core Network and Terminals; Non-Access-Stratum (NAS) functions related to Mobile Station (MS) in idle mode (Release 17)", V17.2.0 (Mar. 2021).

3GPP TS 24.501, "3rd Generation Partnership Project; Technical Specification Group Core Network and Terminals; Non-Access-Stratum (NAS) protocol for 5G System (5GS); Stage 3; (Release 17)", V17.2.1 (Apr. 2021).

* cited by examiner

PUBLIC WARNING SYSTEM MESSAGING IN PRIVATE AND PUBLIC NETWORKS

CROSS-REFERENCE TO RELATED APPLICATION(S)

The present application claims the benefit of and priority to U.S. Provisional Patent Application Ser. No. 63/184,022, filed on May 4, 2021, entitled "METHOD AND APPARATUS FOR PUBLIC WARNING SYSTEM IN NON-PUBLIC NETWORK," and U.S. Provisional Patent Application Ser. No. 63/186,763, filed on May 10, 2021, entitled "PUBLIC WARNING SERVICE FOR PRIVATE NETWORK," the contents of all of which are hereby incorporated herein fully by reference into the present application.

FIELD

The present disclosure generally relates to wireless communications, and more particularly, to public warning system (PWS) messaging in private and/or public networks in the next generation wireless networks.

BACKGROUND

With the tremendous growth in the number of connected devices and the rapid increase in user/network traffic volume, various efforts have been made to improve different aspects of wireless communication for next-generation wireless communication systems, such as the fifth generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

According to the 3rd Generation Partnership Project (3GPP) (e.g., with regard to Release 16 and prior), a Stand-alone Non-Public Network (SNPN) does not support a Public Warning System (PWS). However, under a RAN sharing scenario, a base station (e.g., an eNB in E-UTRA or a gNB in NR) may support one or more Public Land Mobile Network(s) (PLMN(s)) and/or one or more SNPNs. Under the RAN sharing scenario, a UE having to be configured to monitor PWS messaging while the UE has a selected SNPN or a registered SNPN (e.g., when the UE is operating in SNPN Access Mode) has been arguable. This is because monitoring the PWS while the UE is registered to an SNPN may cause erroneous/unnecessary UE/NW behavior.

For example, from the upper layers' (e.g., Non-Access Stratum (NAS) layer or service layer) point of view, when a PWS event occurs (e.g., when an earthquake or fire alarm is triggered), an SNPN messaging (or alert system) may provide more detailed information/instructions (e.g., in comparison with the PWS messages) to guide the user (e.g., holding a UE) to a safe location. Additionally, in SNPN, a PWS indication has to be redesigned/reapplied to support other NW/UW functionalities (e.g., when a PWS event is triggered, a specific SNPN may be configured for the UE to connect with the SNPN to address the upcoming events). For example, when an emergency event occurs (and as a result neighboring PLMNs of the UE trigger a PWS message delivery), the UE may be installed/(pre)configured as a Relay node to forward the information/instructions (transmitted by the SNPN) to the other UEs during such an emergency scenario. Based on the currently pending issues related to an SNPN or a PLMN supporting the PWS, some examples of which are described above, new and improved designs/mechanisms are required to address these issues.

SUMMARY

The present disclosure is directed to public warning system (PWS) messaging in private and/or public networks in the next generation wireless networks.

In a first aspect of the present application, a method for PWS messages reception management is provided. The method includes receiving, via a first serving cell or a higher layer of the UE, a configuration for warning message reception that is associated with a first network; receiving the PWS message from a second network that is supported by a second serving cell; and determining, based on the received configuration, whether to accept the PWS message or to ignore the PWS message.

In an implementation of the first aspect, the first network comprises a first standalone non-public network (SNPN) and the second network comprises a second SNPN.

In another implementation of the first aspect, the first serving cell and the second serving cell are the same.

In another implementation of the first aspect, the first network comprises a public land mobile network (PLMN) and the second network comprises an SNPN.

In another implementation of the first aspect, the first network comprises an SNPN and the second network comprises a PLMN.

In another implementation of the first aspect, the first serving cell comprises a Universal Mobile Telecommunications System (UMTS) Subscriber Identity Module (USIM) and the higher layer comprises a serving Radio Access Network of the UE.

In another implementation of the first aspect, the UE is subscribed to the first network, but not subscribed to the second network.

In another implementation of the first aspect, the UE is registered to the first network and selected the second network.

In another implementation of the first aspect, the UE is neither registered to the second network nor selected the second network.

In another implementation of the first aspect, receiving the PWS message comprises receiving, by a lower layer of the UE, the PWS message, and determining whether to accept or ignore the PWS message comprises determining, whether to pass the PWS message to a higher layer of the UE or not.

In a second aspect, a UE comprising one or more non-transitory computer-readable media having computer-executable instructions is provided. The processor is coupled to the one or more non-transitory computer-readable media, and configured to execute the computer-executable instructions to receive, via a first serving cell or a higher layer of the UE, a configuration for warning message reception that is associated with a first network; receive the PWS message from a second network that is supported by a second serving cell; and determine, based on the received configuration, whether to accept the PWS message or to ignore the PWS message.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
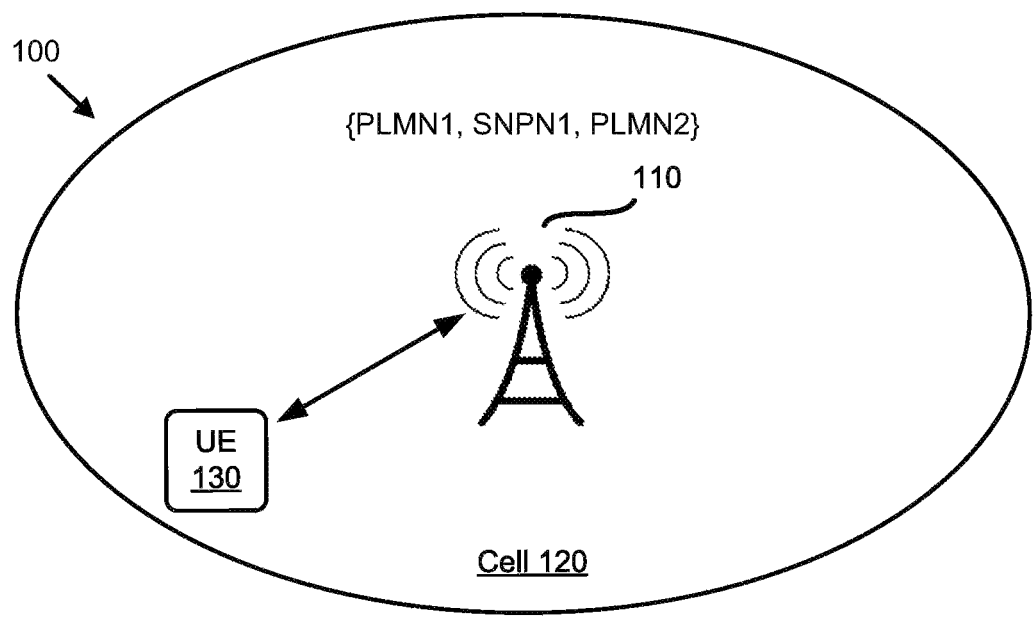
FIG. 1 is a diagram illustrating a base station that supports RAN sharing for PWS messaging, according to an example implementation of the present application.

The acronyms in the present application are defined as follows and unless otherwise specified, the acronyms have the following meanings:

| Acronym | Full name |
| --- | --- |
| 3GPP | 3$^{rd}$ Generation Partnership Project |
| 5GC | 5 G Core |
| ACK | Acknowledgement |
| AMF | Access and Mobility Management Function |
| ARQ | Automatic Repeat Request |
| AM | Access Mode |
| AS | Access Stratum |
| BCCH | Broadcast Control Channel |
| BCH | Broadcast Channel |
| BFR | Beam Failure Recovery |
| BS | Base Station |
| BSR | Buffer Status Report |
| BWP | Bandwidth Part |
| CA | Carrier Aggregation |
| CAG | Closed Access Group |
| CAG-ID | Closed Access Group Identifier |
| CBRA | Contention Based Random Access |
| CFRA | Contention Free Random Access |
| CG | Configured Grant |
| CM | Connection Management |
| CMAS | Commercial Mobile Alert System |
| CN | Core Network |
| C-RNTI | Cell Radio Network Temporary Identifier |
| CS-RNTI | Configured Scheduling Radio Network Temporary Identifier |
| CSI-RS | Channel State Information Reference Signal |
| DCI | Downlink Control Information |
| DL | Downlink |
| DRB | Data Radio Bearer |
| DRX | Discontinuous Reception |
| ETWS | Earthquake and Tsunami Warning System |
| E-UTRA | Evolved UMTS Terrestrial Radio Access |
| E-UTRAN | Evolved UMTS Terrestrial Radio Access Network |
| HARQ | Hybrid Automatic Repeat Request |
| HRNN | Human-Readable Network Name |
| IE | Information Element |
| IMSI | International Mobile Subscriber Identity |
| LCH | Logical Channel |
| LCG | Logical Channel Group |

-continued

| Acronym | Full name |
| --- | --- |
| LCP | Logical Channel Prioritization |
| MAC | Medium Access Control |
| MCC | Mobile Country Code |
| MIB | Master Information Block |
| MICO | Mobile Initiated Connection Only |
| MSG | Message |
| NAS | Non-Access Stratum |
| NG-RAN | Next-Generation Radio Access Network |
| NID | Network Identifier |
| NPN | Non-Public Network |
| NR | New Radio |
| NW | Network |
| PCell | Primary Cell |
| PCCH | Paging Control Channel |
| PDCCH | Physical Downlink Control Channel |
| PDCP | Packet Data Convergence Protocol |
| PDU | Protocol Data Unit |
| PF | Paging Frame |
| PLMN | Public Land Mobile Network |
| PO | Paging Occasion |
| PRACH | Physical Random Access Channel |
| PUCCH | Physical Uplink Control Channel |
| PUSCH | Physical Uplink Shared Channel |
| PLMN | Public Land Mobile Network |
| QoS | Quality of Service |
| RA | Random Access |
| RACH | Random Access Channel |
| RAN | Radio Access Network |
| RAT | Radio Access Technology |
| RB | Radio Bearer |
| Rel | Release |
| RLC | Radio Link Control |
| RNA | RAN-based Notification Area |
| RNAU | RAN-based Notification Area Update |
| RNTI | Radio Network Temporary Identifier |
| RRC | Radio Resource Control |
| RSRP | Reference Signal Receiving Power |
| SCell | Secondary Cell |
| SCG | Secondary Cell Group |
| SCS | Sub Carrier Spacing |
| SNPN | Stand-alone Non-Public Network |
| SDT | Small Data Transmission |
| SDU | Service Data Unit |
| SFN | System Frame Number |
| SI | System Information |
| SIB | System Information Block |
| SINR | Signal to Interference plus Noise Ratio |
| SLIV | Start and Length Indicator |
| SNPN | Stand-alone Non-Public Network |
| SR | Scheduling Request |
| SRB | Signaling Radio Bearer |
| SSB | Synchronization Signal Block |
| S-TMSI | SAE-Temporary Mobile Subscriber Identity |
| SUL | Supplementary Uplink |
| TA | Timing Advance or Time Alignment |
| TAG | Timing Advance Group |
| TS | Technical Specification |
| UAC | Unified Access Control |
| UE | User Equipment |
| UL | Uplink |
| UMTS | Universal Mobile Telecommunications System |
| UPF | User Plane Function |

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may differ in other respects, and thus may not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed descriptions of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software, or a combination of software and hardware. Described functions may correspond to modules which may be software, hardware, firmware, or any combination thereof. The software implementation may comprise computer executable instructions stored on a computer-readable medium, such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of one or more Application-Specific Integrated Circuits (ASICs), programmable logic arrays, and/or one or more Digital Signal Processor (DSPs). Although some of the example implementations described in this specification are oriented to software installed and executing on computer hardware, nevertheless, alternative example implementations implemented as firmware, as hardware, or as a combination of hardware and software are well within the scope of the present disclosure.

The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, an Master Cell Group (MCG) may be formed by an MN, and a Secondary Cell Group (SCG) may be formed by an SN. In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the Medium Access Control (MAC) entity is associated with the MCG or the SCG. Otherwise, the term Special Cell may refer to the PCell. A Special Cell may support a Physical Uplink Control Channel (PUCCH) transmission and contention-based Random Access, and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

Examples of some of the terms and their corresponding definitions used in the present application are provided below.

Acceptable Cell: an acceptable cell is a cell on which the UE may camp to obtain limited services (e.g., such as originating emergency calls, receiving ETWS and CMAS notifications, etc.). An acceptable cell may fulfil different requirements, in a minimum set of requirements to initiate an emergency call and to receive ETWS and CMAS notifications in an NR network. The requirements may include the acceptable cell not being barred and the acceptable cell selection criteria being fulfilled (e.g., see 3GPP Technical Specification (TS)38.304). If a UE has an ongoing emergency call, all acceptable cells of the corresponding PLMN are treated as suitable for the duration of the emergency call.

Allowed CAG list: a list that includes a per-PLMN list of CAG Identifiers that the UE may be allowed to access (e.g., see 3GPP Technical Specification (TS)23.501).

Available PLMN(s): includes a list of one or more PLMNs for which the UE has found at least one cell and has read its PLMN identity(ies).

Barred Cell: a cell on which a UE is not allowed to camp. A cell is barred if it is so indicated in the system information (e.g., as specified in 3GPP TS 38.331).

CAG cell: a cell that is broadcasting at least one Closed Access Group (CAG) Identifier (ID).

CAG Member Cell: for a UE, a cell that is broadcasting the identity of the selected PLMN, registered PLMN, or equivalent PLMN, and the cell that is broadcasting a CAG identifier belonging to the Allowed CAG list of the UE for that PLMN.

CAG-only cell: a cell that provides access only to CAG cells.

Camped on a cell: after a UE has completed a cell selection/reselection process and has chosen a cell, the UE camps on the cell and monitors system information and (in most cases) paging information received from the camped cell.

Camped on any cell: when a UE is in an idle state and has completed a cell selection/reselection process and has chosen a cell irrespective of the PLMN identity. A UE may camp on a cell that belongs to a registration area that is forbidden for regional provision of service. A cell that belongs to a registration area that is forbidden for regional provision service (e.g., see 3GPP TS 23.122 and TS 24.501) is suitable, but provides only limited service.

CAG Identifier: identifies a CAG within a PLMN.

Commercial Mobile Alert System: a Public Warning System (PWS) that delivers warning notifications provided by warning notification providers to CMAS capable UEs.

EHPLMN: any of the PLMN entries contained in an Equivalent HPLMN list (e.g., see TS 23.122).

Equivalent PLMN list: a list of PLMNs that is considered as an equivalent by the UE for cell selection, cell reselection, and handover according to the information provided by the NAS.

Home PLMN: a PLMN where the Mobile Country Code (MCC) and Mobile Network Code (MNC) of the PLMN identity are the same as the MCC and MNC of the IMSI.

Network identifier: identifies an SNPN in combination with a PLMN ID (e.g., see TS 23.501).

Non-Public Network: a network deployed for non-public use (e.g., see 3GPP Technical Specification TS 22.261).

Process: a local action or a combination of actions in the UE that is/are invoked by an RRC procedure or an RRC_IDLE procedure or an RRC_INACTIVE state procedure. A UE is not required to support manual search and selection of PLMN or CAG or SNPN while the UE is in an RRC CONNECTED state. The UE may use local release of RRC connection to perform manual search if it is not possible to perform the search while in the RRC connected state.

Radio Access Technology: is a type of technology that is used for radio access (e.g., NR or E-UTRA).

Registration Area: (NAS) registration area is an area in which the UE may roam without a need to perform location registration (e.g., often a NAS procedure).

Registered PLMN: a PLMN on which certain Location Registration outcomes have occurred (e.g., as specified in TS 23.122).

Registered SNPN: an SNPN on which certain Location Registration outcomes have occurred (e.g., as specified in TS 23.122).

Reserved Cell: a cell on which camping is not allowed, except for particular UEs, if so indicated in the system information (e.g., as specified in TS 38.331).

Selected PLMN: is the PLMN that has been selected by the NAS layer, either manually or automatically.

Selected SNPN: is the SNPN that has been selected by the NAS layer, either manually or automatically.

Serving cell: a cell on which the UE is camped.

SNPN Access Mode: is mode of operation where the UE only selects SNPNs (e.g., as defined in TS 23.501).

SNPN identity: an identifier of an SNPN comprising of a PLMN ID and an NID combination.

SNPN-only cell: a cell that provides access only to SNPNs.

Strongest cell: a cell on a particular frequency that is considered strongest according to the layer 1 cell search procedure (e.g., see TS 38.213 and TS 38.215).

Suitable Cell: for a UE that is not operating in SNPN Access Mode, a cell is considered as suitable if the following conditions are fulfilled: (1) the cell is part of either the selected PLMN or the registered PLMN or PLMN of the Equivalent PLMN list, and for that PLMN either the PLMN-ID of that PLMN is broadcast by the cell with no associated CAG-IDs and CAG-only indication in the UE for that PLMN (e.g., as indicated in 3GPP TS 23.501) is absent or false; (2) the allowed CAG list that is in the UE for that PLMN (e.g., as indicated in 3GPP TS 23.501) includes a CAG-ID broadcast by the cell for that PLMN; (3) the cell selection criteria are fulfilled (e.g., 3GPP TS 38.304); (4) according to the latest information provided by the NAS layer, the cell is not barred (e.g., see 3GPP TS 38.304) and/or the cell is part of at least one TA that is not part of the list of "Forbidden Tracking Areas" (e.g., as indicated in 3GPP TS 22.261), which belongs to either the selected SNPN or the registered SNPN of the UE.

NR (e.g., which is connected to a 5GC) may provide support for a public warning systems (PWS) through system information broadcasting capability. Additionally, NR may be responsible for scheduling and broadcasting of the warning messages, as well as for paging the UE to provide an indication that the warning message is being broadcast. An Earthquake and Tsunami Warning System (ETWS) is a public warning system that is developed to meet the regulatory requirements for warning notifications related to earthquake and/or tsunami events (e.g., see TS 22.168 [14]).

ETWS warning notifications may either be a primary notification (e.g., short notification) or a secondary notification (e.g., providing more detailed information). Commercial Mobile Alert System (CMAS) is also a public warning system that is developed for the delivery of multiple concurrent warning notifications (e.g., see 3GPP TS 22.268). In some implementations, different SIBs may be defined for the ETWS primary notifications, ETWS secondary notifications, and/or CMAS notifications. Paging may be used to inform UEs about the ETWS and/or CMAS indications. A UE may monitor the ETWS/CMAS indication on its own paging occasion while the UE is in an RRC_IDLE and/or RRC_INACTIVE state. Conversely, a UE may monitor the ETWS/CMAS indication on any paging occasion while the UE is in an RRC_CONNECTED state. A paging that indicates the ETWS/CMAS notification may trigger the acquisition of system information for ETWS/CMAS message reception (e.g., without delaying until the next modification period).

KPAS and EU-Alert are other public warning systems that are developed for the delivery of multiple concurrent warning notifications (e.g., see 3GPP TS 22.268). KPAS and EU-Alert may use the same AS mechanisms as the CMAS. Therefore, the NR procedures defined for CMAS may equally apply to KPAS and EU-Alert. In some implementations, when a UE is in an RRC_CONNECTED state, the UE may monitor the paging channels in any PO that is signaled in the system information for SI change indication and PWS notification. In the case of multiple (DL) Bandwidth Part (BWP) configurations a UE in RRC_CONNECTED state may only monitor the paging channels on the active (DL) BWP with common search space configured.

As described above, in 3GPP Release 16 technical specification, Stand-alone Non-Public Network (SNPN) does not support a Public Warning System (PWS), such as an ETWS or a CMAS. In some implementations, a UE (e.g., an ETWS capable or a CMAS capable UE) may be able to read a short message (e.g., which may be included in the paging DCI broadcast by the serving cell), which has been broadcast by radio access network for a paging procedure. Within the short message, a bit (e.g., a PWS indication) may be configured to inform the UE that a PWS message is delivered by a serving RAN (e.g., via broadcasting system information). For example, the serving RAN may broadcast SIB6/SIB7/SIB8 for a PWS message delivery.

It should also be noted that, in some implementations, for a specific non-public network (e.g., a SNPN), a UE may also be configured/enabled to access the SNPN by using the credentials that may have been received from a (third party) credential holder. In some additional implementations, for a specific non-public network (e.g., a SNPN), the SNPN may or may not support onboarding. The UE may receive one or more indicators, for example, from broadcasting system information (SI) delivered by a serving cell that may support one or more SNPNs. In some such implementations, the one or more indicators in the broadcasting SI may be used to indicate to the UE whether a specific SNPN (e.g., that is supported by the serving cell) supports onboarding (or not). In some other implementations, the one or more indicators in the broadcasting SI may be used to indicate to the UE whether a specific SNPN (e.g., supported by the serving cell) supports (or not support) the UE accessing the SNPN via third party credentials. However, it may not be clear whether such a UE (e.g., a UE that accesses a specific SNPN via third party credentials or via onboarding) can still receive PWS messages from its serving cell. Some of the present implementations, as described below, provide new mechanisms for a LIE (e.g., that accesses an SNPN via third party credentials or via onboarding) to receive PWS messages from its serving cell.

Although an SNPN may not support the PWS (e.g., according to 3GPP Release 16), under a RAN sharing scenario, a base station (e.g., an eNB in E-UTRA or a gNB in NR) may support one or more networks (e.g., one or more PLMNs and/or one or more SNPNs). Therefore, even if the UE has a selected SNPN or registered to an SNPN, the UE may still be able to monitor the short messages during a paging occasion monitoring. In some implementations, after determining that a PWS message (or notification) is about to be delivered (e.g., by the serving RAN via broadcasting system information), a UE may switch to the initial DL BWP to monitor the SIB 1 and the following PWS SIBs (e.g., SIB6/SIB7/SIB8 in new radio protocols), which may not be desirable.

FIG. 1 is a diagram 100 illustrating a base station that supports RAN sharing for PWS messaging, according to an example implementation of the present application. As shown in FIG. 1, a base station (e.g., a gNB) 110 may configure a logical entity, which is a cell 120, to serve one or more UEs 130. In addition, BS 110 may support RAN sharing (e.g., having access to multiple RANs), which may include, as shown in the figure, PLMN1, SNPN1, and PLMN2. Although three RANs are shown in FIG. 1, additional SNPNs and/or PLMNs may be included in the RAN sharing supported by BS 110 (or cell 120). Moreover, in this example, SNPN1 may not support the PWS. However, PLMN1 and PLMN2 may support the PWS. Therefore, during a paging message monitoring, UE 130 may still be able to monitor a PWS indication, for example, in the short message, to detect the possible PWS SIB broadcasting (e.g., SIB6/SIB7/SIBB), even if UE 130 has selected (or registered to) SNPN1, which does not support PWS messaging.

As discussed above, UE 120 being configured to monitor PWS messaging while the UE has a selected SNPN or a registered SNPN (e.g., while the UE is operating in the SNPN Access Mode, for example, from the NAS or service layer's point of view) may not be desirable. For example, such availability may cause erroneous/un-necessary UE (or NW) behavior. As an example, when a PWS event occurs (e.g., when an earthquake or fire alarm is triggered), an SNPN may provide more detailed information/instructions (in comparison with the PWS messages) to guide the user (e.g., who is holding the UE) to a safe location. Additionally, in SNPN, a PWS indication has to be redesigned/reapplied to support other NW/UW functionalities (e.g., when a PWS event is triggered, a specific SNPN may be configured for the UE to connect with the SNPN to address the upcoming events). For example, when an emergency event occurs (and as a result the neighboring PLMNs of the UE trigger a PWS message delivery), the UE may be installed/(pre)configured as a Relay node to forward the information/instructions (transmitted by the SNPN) to the other UEs during such an emergency event. Some of the present implementations may provide one or more mechanisms to address the above-described issues (e.g., issues related to the SNPN supporting of the PWS).

For example, some of the present implementations provide a mechanism for the UE to monitor the incoming PWS messages and depending on how the UE is configured (e.g., depending on the configuration received from a higher layer of the UE, from a serving cell, etc.) the UE may determine to pass the received PWS messages to the higher layer (e.g., after decoding the messages) or, alternatively, to ignore the received (e.g., and decoded) PWS messages.

It should be noted that even though the mechanisms described above and below for monitoring PWS messages are mostly described with regard to NR, the described mechanisms may be equally applicable to other Radio Access Technologies (RATs), such as LTE, Narrow Band Internet-of-Things (NB-IoT), New Radio Non-Terrestrial-Network (NR NTN).

Additionally, the proposed mechanisms may not be limited by the scope of SNPN and may equally be applicable to PNI-NPN.

In some implementations, a UE that is in an SNPN access mode may not be able (or may be disabled) to receive the PWS messages under a RAN sharing scenario. In some implementations, such a UE may not be able (or may be disabled) to receive PWS messages from its serving cell (e.g., under the RAN sharing scenario). For example, a UE may check a particular IE, such as the CellAccessRelatedInfor IE, in the SIB to determine whether it is under a RAN sharing scenario or not. In some other implementations, the UE (that is operating under the SNPN access mode) may be configured (e.g., by the NAS layer or the AS layer) to not receive the PWS messages, and/or not to decode the PWS indication in the short message.

In some implementations, the UE (e.g., that is in the SNPN access mode) may be preconfigured to stop monitoring/decoding (or to ignore) the PWS indication bit (e.g., the etwsAndCmasIndication bit in the Short Message, which may be received by the UE during a paging occasion monitoring) in the short message configured for the PWS. Such a (pre)configuration may be (pre)installed in the USIM or may be (pre)stored in the memory module of the UE. In some implementations, the (pre)configuration may be defined (or specified) by the 3GPP technical specification. In addition, the UE may also be disabled to receive/decode the broadcasting system information configured for the PWS message delivery (e.g., SIB6/SIB7/SIB8 or any PWS-related SIB in the NR protocols) when the UE identifies a PWS message delivery (e.g., via reading SIB1 of the serving cell directly).

In some implementations, the UE may be configured by the NW (e.g., by the CN via (at least) one NAS message or by RAN via (at least) one AS message, such as a UE-specific RRC message or cell-specific system information, or via a MAC CE or through DCI) to disable the UE (e.g., the UE in the SNPN access mode) to monitor/apply/execute the PWS indication bit in the PWS message. Additionally, the UE may also be disabled to (directly) receive/decode the broadcasting system information configured for a PWS message delivery method (e.g., SIB6/SIB7/SIB8 or any PWS-related SIB in the NR protocols).

In some implementations, a UE operating under the SNPN access mode (or a UE that is disabled to decode the PWS indication in the short message during a PO monitoring) may consider the original/existing PWS indication as a reserved bit and may ignore the original/existing PWS indication. In contrast, a UE that is not operating under the SNPN access mode (or a UE that is enabled to decode the PWS indication in the short message during a PO monitoring) may not consider the original/existing PWS indication as a reserved bit and, as such, the UE may try to decode the PWS indication directly during the PO monitoring. In some other implementation, a UE operating in the SNPN access mode may not be triggered to monitor the system information related to the PWS even if the PWS indication bit in the short message (e.g., that is received by the UE) is set to "true" or "1".

In some implementations, a UE may resume the conventional PWS reception activity (e.g., while the UE is monitoring the PWS indication bit in the short message during the Paging Occasions monitoring or while the UE is executing/applying paging message monitoring procedure) after the UE moves out of the SNPN access mode (e.g., the NAS layer of the UE side may switch out of the SNPN access mode or switch to a non-SNPN access mode or switch to a PLMN access mode). The NAS layer (e.g., of the UE) may then instruct the AS layer to implement a PLMN selection by sending a PLMN selection request to the RRC entity of the UE.

In some implementations, during the PWS message reception procedure (e.g., the UE may initially be triggered to receive SIB6/SIB7/SIB8 after receiving the short message with a PWS indication set to "1" of "true"), the UE (e.g., the RRC entity of the UE) may receive an SNPN selection request from the NAS layer when the UE originally has a selected/registered PLMN (e.g., the UE may be operating in a non-SNPN access mode or the UE may not operate in the SNPN access mode). Under such a condition, the UE may stop receiving the PWS messages broadcast by the serving cell (e.g., through SIB6/SIB7/SIB8 or any other PWS-related SIB(s)) and/or may stop forwarding the content in SIB6/7/8 to the upper layers, while the UE receives (at least one) SNPN selection request from the upper layers (e.g., from the NAS layer of the UE).

In some implementation, the UE may not stop/withdraw from/abandon receiving the PWS message(s) broadcast by the serving cell when/after the UE receives (at least one) SNPN selection request from the upper layers (e.g., from the NAS layer of the UE). After the UE (e.g., the lower layers of the UE) forwards the content in SIB6/7/8 (or PWS-related SIB(s)) to the upper layers, the UE may then perform the SNPN selection. In some implementations, when a UE receives a PWS message(s) on a current PLMN and the reception of the PWS message(s) is not completed yet, the UE may suspend (or refuse to) perform the SNPN selection (e.g., after the UE receives an SNPN selection request from the upper layers). In this case, (the lower layers of) the UE may further notify (or indicate to) the upper layers that the SNPN selection request is rejected/suspended. (The lower layers of) the UE may additionally indicate that the reason for suspension/rejection of the SNPN selection request may be due to a PWS message(s) reception. After the PWS message(s) reception is completed, (the lower layers of) the UE may resume the SNPN selection. In some implementations, after a PWS message(s) reception is completed, (the lower layers of) the UE may indicate to the upper layers that the SNPN selection request is allowed/resumed.

In some implementations, a UE that is in an SNPN access mode may still be enable (e.g., implicitly and/or explicitly) to read the PWS messages even if the SNPN (e.g., the SNPN selected by the UE or the registered SNPN of the UE) does not support PWS messaging.

In some implementations, the UE (e.g., in SNPN access mode) may be preconfigured to monitor/decode the PWS indication bit in the short message configured for the PWS. The (pre)configuration for such a monitoring/decoding may be (pre)installed in the USIM or (pre)stored in the memory module of the UE. In some implementations, the (pre) configuration may be defined in the technical specification. In addition, the UE may also be enabled to (directly) receive/decode the broadcasting system information configured for the PWS message delivery (e.g., via SIB6/SIB7/SIB8 or any other PWS-related SIB in the NR protocols) when the UE notices a PWS message delivery by reading the SIB1 of the serving cell directly or by reading the PWS indication in the short message.

In some implementations, the NW (e.g., by the CN via (at least) one NAS message or by RAN via (at least) one AS message, such as a UE-specific RRC message or cell-specific system information) may configure the UE (e.g., the UE in SNPN access mode) to monitor the PWS indication bit in the short message (e.g., and the following PWS messages). In addition, the UE may also be enabled to (directly) receive/decode the broadcasting system information configured for the PWS message delivery (e.g., via SIB6/SIB7/SIB8 or any other PWS-related SIB in the NR protocols).

In some implementations, a UE operating under the SNPN access mode (or a UE that is enabled to decode the PWS indication in the short message during a PO monitoring) may not consider the original PWS indication as a reserved bit (e.g., after the UE is enabled to receive the PWS message) and may ignore the original/existing PWS indication.

In some implementations, to support PWS in SNPN, the paging (e.g., the short message) may be further enhanced. In some such implementations, paging, especially the short message, may include an ETWS indication and/or a CMAS indication and/or a PWS indication, to inform a UE, that is in an SNPN AM (e.g., with/without a selected or registered SNPN defined in 3GPP Rel-17 and/or beyond), of whether the UE needs to read the system information for acquiring the ETWS information (e.g., the primary/secondary/integrated notification of the ETWS) and/or CMAS information (e.g., the warning notification of the CMAS). The UE in an SNPN AM, that is in an RRC_IDLE state or in an RRC_INACTIVE state, may monitor the short message for the ETWS indication and/or CMAS indication and/or PWS indication in its own paging occasion. The UE (in an SNPN AM) may derive its own paging occasion based on a PF/PO formula and its (i.e., UE's) identity. The UE in the SNPN AM that is in an RRC_CONNECTED state may monitor the short message for the ETWS indication and/or CMAS indication and/or PWS indication in any paging occasion.

In some implementations, once the UE receives the ETWS indication and/or CMAS indication and/or PWS indication in the short message, and if the ETWS indication or PWS indication indicates to the UE to acquire the ETWS information, the UE may acquire the system information related to the ETWS (e.g., via SIB6, SIB7, the first system information block, the second system information block, the fourth system information block, etc.), for example, without delaying and until the next modification period. In some such implementations, if the CMAS indication or the PWS indication indicates to the UE to acquire the CMAS information, the UE may acquire the system information related to the CMAS (e.g., via SIB8, the third system information block, the fifth system information block, etc.) for example, without delaying and until the next modification period.

In some implementations, the UE may acquire the system information related to the ETWS information and/or the system information related to the CMAS information by monitoring the PDSCH. The system information related to the ETWS information and/or the system information related to the CMAS information may be broadcast by the cell on the PDSCH. In some implementations, if the UE cannot acquire the system information related to the ETWS information and/or the system information related to the CMAS information (e.g., within the modification period), the UE may perform the SI request procedure (e.g., with the cell) to request the system information related to the ETWS information and/or the system information related to the CMAS information. For example, if the UE is in an RRC_IDLE state or in an RRC_INACTIVE state, the UE may transmit the RA resources associated with the requested system information that is related to the ETWS information, and/or associated with the requested system information related to the CMAS information, to the serving/camped cell, or the UE may transmit an RRC message (e.g., an RRCSystemInfoRequest message) including the request for the system information (e.g., system information message(s) or system information block(s)) related to the ETWS information and/or the request for the system information (e.g., system information message(s) or system information block(s)) related to the CMAS information, in an RA procedure (e.g., after the UE receives a RAR), to the serving/camped cell.

In some implementations, if the UE is in an RRC_CONNECTED state, the UE may transmit the RA resources associated with the requested system information related to the ETWS information, and/or associated with the requested system information (e.g., system information message(s) or system information block(s)) related to the CMAS information, to the serving cell, or the UE may transmit a first RRC message (e.g., an RRCSystemInfoRequest message) that includes the request for the system information (e.g., system information message(s) or system information block(s)) related to the ETWS information, and/or the request for the system information (e.g., system information message(s) or system information block(s)) related to the CMAS information, in an RA procedure (e.g., after the UE receives a RAR), to the serving cell, or the UE may transmit a second RRC message (e.g., DedicatedSIBRequest) including the request for the system information (e.g., system information message(s) or system information block(s)) related to the ETWS, and/or the request for the system information related to CMAS, to the serving cell.

It should be noted that the short messages may be transmitted by the cell on PDCCH using P-RNTI with or without associated paging message using Short Message field in DCI format 1_0. A UE may first receive the short messages in paging occasions and then decode the short messages using P-RNTI.

In some implementations, to support PWS in SNPN, a short message may include eight bits. In some implementations, a legacy short message may be applicable in PLMN networks, including cells that support PLMN and UEs that are not in an SNPN AM, as shown in Table 1 below. In some such implementations, however, a legacy short message may not be applicable in SNPN networks, including cells that support SNPN and UEs that are in SNPN AM. Some implementations may use different bits in a short message (e.g., that includes eight bits) to indicate one or more SNPNs. For example, a bitmap may be provided in the short message and each bit in the bitmap may be associated with one SNPN (e.g., that is supported by the cell). For example, some implementations may provide (1) a second bit in the short message scheme, (2) a new reserved bit (e.g., the fourth bit) in the short message scheme, (3) two new reserved bits (e.g., the fourth bit and the fifth bit) in the short message scheme, and (4) a new reserved bit (e.g., the fourth bit) for SNPN indication in the short message scheme.

The Second Bit in the Short Message Scheme:

For indicating the ETWS and/or CMAS some implementations may utilize the second bit (e.g., etwsAndCmasIndication) in the short message. In some such implementations, for example, if the second bit is set to '1', it may represent the indication of an ETWS primary notification and/or an ETWS secondary notification and/or a CMAS notification. Conversely, if the second bit is set to '0', it may indicate that there is no ETWS primary notification, no ETWS secondary notification, and no CMAS notification.

In some implementations, a UE in the SNPN AM (e.g., as defined in 3GPP Release 17 and/or beyond), for example, with/without a selected or registered SNPN, may acquire the system information blocks related to the ETWS and/or the system information block related to the CMAS, from the cell that transmits the short message, after the UE receives the second bit having a value of '1'. The UE in the SNPN AM, however, may not acquire the system information blocks related to the ETWS and/or the system information block related to the CMAS, from the cell transmitting the short message, after the UE receives the second bit having a value of '0'.

In some implementations, a UE that is not in the SNPN AM (e.g., as defined in 3GPP Release 17 and/or beyond), for example, with/without a selected or registered PLMN, may acquire the system information blocks related to the ETWS (e.g., SIB6 and/or SIB7), and/or the system information block related to the CMAS (e.g., SIB8), from the cell transmitting the short message, after the UE receives the second bit as '1'. The UE that is not in the SNPN AM, however, may not acquire the system information blocks related to the ETWS (e.g., SIB6 and/or SIB7) and/or the system information block related to the CMAS (e.g., SIB8), from the cell transmitting the short message, after the UE receives the second bit as '0'.

In some implementations, a UE that only supports ETWS (e.g., an ETWS-capable UE that is not CMAS-capable) may acquire the system information blocks related to the ETWS, from the cell transmitting the short message, after the UE receives the second bit as '1'. The UE that only supports ETWS (e.g., an ETWS-capable UE that is not CMAS-capable) may not acquire the system information block related to the CMAS, from the cell transmitting the short message, after the UE receives the second bit as V. The UE that only supports ETWS (e.g., an ETWS-capable UE that is not CMAS-capable) may not acquire the system information blocks related to the ETWS nor the system information block related to the CMAS, from the cell transmitting the short message, after the UE receives the second bit as '0'.

In some implementations, a UE that only supports CMAS (e.g., a CMAS-capable UE that is not ETWS-capable) may acquire the system information blocks related to the CMAS, from the cell transmitting the short message, after the UE receives the second bit as '1'. The UE that only supports CMAS (e.g., a CMAS-capable UE that is not ETWS-capable) may not acquire the system information block related to the ETWS, from the cell transmitting the short message, after the UE receives the second bit as V. The UE that only supports CMAS (e.g., a CMAS-capable LIE that is not ETWS-capable) may not acquire the system information blocks related to the ETWS nor the system information block related to the CMAS, from the cell transmitting the short message, after the UE receives the second bit as '0'.

In some implementations, the cell transmitting the short message may be a cell that supports (at least) one SNPN and/or a cell that supports (at least) one PLMN.

TABLE 1

Short message in legacy PLMN network

| Bit | Short Message |
|---|---|
| 1 | systemInfoModification<br>If set to 1: indication of a BCCH modification other than SIB6, SIB7, and SIB8. |

TABLE 1-continued

Short message in legacy PLMN network

Bit  Short Message 2  etwsAndCmasIndication
   If set to 1: indication of an ETWS primary notification
   and/or an ETWS secondary notification and/or a CMAS notification.
3  stopPagingMonitoring
   This bit may be used for operations with shared spectrum channel
   access and when nrofPDCCH-MonitoringOccasionPerSSB-InPO
   is present.
   If set to 1: indication that the UE may stop monitoring
   PDCCH occasion(s) for paging in this Paging Occasion, for example,
   as specified in 3GPP TS 38.304.
4-8  Not used in the legacy release of the specification, and may be
   ignored by UE if received.
   Note: The legacy release, as used in this disclosure, includes 3GPP
   Rel-16 and prior releases.

A New Reserved Bit (e.g., the Fourth Bit) in the Short Message Scheme:

For indicating the ETWS indication and/or CMAS indication, some implementations may utilize a new reserved bit (e.g., the fourth bit) in the short message, as shown in Table 2 below. In some such implementations, if the new reserved bit is set to '1', it may represent the indication of an ETWS primary notification and/or an ETWS secondary notification and/or a CMAS notification in SNPN. If the new reserved bit, however, is set to '0', it may indicate that there is no ETWS primary notification, no ETWS secondary notification, and no CMAS notification in SNPN.

The UE in SNPN AM (e.g., as defined in 3GPP Release 17 and/or beyond), with/without a selected or registered SNPN, may acquire the system information blocks related to ETWS (e.g., the first system information block, the second system information block, the fourth system information block), and/or the system information block related to CMAS (e.g., the third system information block, the fifth system information block), from the cell transmitting the short message, after the UE receives the new reserved bit as '1'. The UE in SNPN AM, however, may not acquire the system information blocks related to ETWS and/or the system information block related to CMAS, from the cell transmitting the short message, after the UE receives the new reserved bit as '0'.

A UE that is not in SNPN AM (e.g., as defined in 3GPP Release 17 and/or beyond), with/without a selected or registered PLMN, may not receive (or may receive, but ignore) the new reserved bit in the short message.

A UE that is not in SNPN AM (e.g., as defined in 3GPP Release 17 and/or beyond), with/without a selected or registered PLMN, may acquire the system information blocks related to ETWS (e.g., the first system information block, the second system information block, the fourth system information block) and/or the system information block related to CMAS (e.g., the third system information block, the fifth system information block), from the cell transmitting the short message, after the UE receives the new reserved bit as '1'. The UE that is not in SNPN AM (e.g., as defined in 3GPP Release 17 and/or beyond), with/without a selected or registered PLMN, may not acquire the system information blocks related to ETWS (e.g., the first system information block, the second system information block, the fourth system information block), and/or the system information block related to CMAS (e.g., the third system information block, the fifth system information block), from the cell transmitting the short message, after the UE receives the new reserved bit as '0'.

The UE that only supports ETWS (e.g., an ETWS-capable UE which is not CMAS-capable), and in SNPN AM, with/without a selected or registered SNPN, may acquire the system information blocks related to ETWS (e.g., the first system information block, the second system information block, the fourth system information block), from the cell transmitting the short message, after the UE receives the new reserved bit as '1'. The UE that only supports ETWS (e.g., an ETWS-capable UE which is not CMAS-capable), and in SNPN AM, with/without a selected or registered SNPN, may not acquire the system information block related to CMAS (e.g., the third system information block, the fifth system information block), from the cell transmitting the short message, after the UE receives the new reserved bit as '1'. The UE that only supports ETWS (e.g., an ETWS-capable UE which is not CMAS-capable), and in SNPN AM, with/without a selected or registered SNPN, may not acquire the system information blocks related to ETWS (e.g., the first system information block, the second system information block, the fourth system information block) nor the system information block related to CMAS (e.g., the third system information block, the fifth system information block), from the cell transmitting the short message, after the UE receives the new reserved bit as '0'.

The UE that only supports ETWS (e.g., an ETWS-capable UE which is not CMAS-capable) and that is not in SNPN AM, with/without a selected or registered PLMN, may not receive (or may receive, but ignore) the new reserved bit in the short message.

The UE that only supports ETWS (e.g., an ETWS-capable UE which is not CMAS-capable), and not in SNPN AM, with/without a selected or registered PLMN, may acquire the system information blocks related to ETWS (e.g., the first system information block, the second system information block, the fourth system information block), from the cell transmitting the short message, after the UE receives the new reserved bit as '1'. The UE that only supports ETWS (e.g., an ETWS-capable UE which is not CMAS-capable) and that is not in SNPN AM, with/without a selected or registered PLMN, may not acquire the system information blocks related to ETWS (e.g., the first system information block, the second system information block, the fourth system information block), and/or the system information block related to CMAS (e.g., the third system information block, the fifth system information block), from the cell transmitting the short message, after the UE receives the new reserved bit as '0'.

The UE that only supports CMAS (e.g., a CMAS-capable UE which is not ETWS-capable), and in SNPN AM, with/without a selected or registered SNPN, may acquire the system information block related to CMAS (e.g., the third system information block, the fifth system information block), from the cell transmitting the short message, after the UE receives the new reserved bit as '1'. The UE that only supports CMAS (e.g., a CMAS-capable UE which is not ETWS-capable), and in SNPN AM, with/without a selected or registered SNPN, may not acquire the system information blocks related to ETWS (e.g., the first system information block, the second system information block, the fourth system information block), from the cell transmitting the short message, after the UE receives the new reserved bit as '1'. The UE that only supports CMAS (e.g., a CMAS-capable UE which is not ETWS-capable), and in SNPN AM, with/without a selected or registered SNPN, may not acquire the system information blocks related to ETWS (e.g., the first system information block, the second system information block, the fourth system information block) nor the system information block related to CMAS (e.g., the third system information block, the fifth system information block), from the cell transmitting the short message, after the UE receives the new reserved bit as '0'.

The UE that only supports CMAS (e.g., a CMAS-capable UE which is not ETWS-capable), and not in SNPN AM, with/without a selected or registered PLMN, may not receive (or may receive, but ignore) the new reserved bit in the short message.

The UE that only supports CMAS (e.g., a CMAS-capable UE which is not ETWS-capable), and not in SNPN AM, with/without a selected or registered PLMN, may acquire the system information block related to CMAS (e.g., the third system information block, the fifth system information block), from the cell transmitting the short message, after the UE receives the new reserved bit as '1'. The UE that only supports CMAS (e.g., a CMAS-capable UE which is not ETWS-capable), and not in SNPN AM, with/without a selected or registered PLMN, may not acquire the system information blocks related to ETWS (e.g., the first system information block, the second system information block, the fourth system information block), after the UE receives the new reserved bit as '1'. The UE that only supports CMAS (e.g., a CMAS-capable UE which is not ETWS-capable), and not in SNPN AM, with/without a selected or registered PLMN, may not acquire the system information blocks related to ETWS (e.g., the first system information block, the second system information block, the fourth system information block), and/or the system information block related to CMAS (e.g., the third system information block, the fifth system information block), from the cell transmitting the short message, after the UE receives the new reserved bit as '0'.

The cell transmitting the short message including the new reserved bit scheme may be a cell supporting (at least) one SNPN and/or may be a cell supporting (at least) one PLMN.

TABLE 2

Short message in a new reserved bit in the short message scheme

| Bit | Short Message |
|---|---|
| 1 | systemInfoModification<br>If set to 1: indication of a BCCH modification other than SIB6, SIB7, and SIB8. |
| 2 | etwsAndCmasIndication<br>If set to 1: indication of an ETWS primary notification and/or an ETWS secondary notification and/or a CMAS notification. |
| 3 | stopPagingMonitoring<br>This bit may be used for operations with shared spectrum channel access and when nrofPDCCH-MonitoringOccasionPerSSB-InPO is present.<br>If set to 1: indication that the UE may stop monitoring PDCCH occasion(s) for paging in this Paging Occasion, as specified in 3GPP TS 38.304. |
| 4 | etwsAndCmasIndicationSNPN<br>If set to 1: indication of an ETWS primary notification and/or an ETWS secondary notification and/or a CMAS notification in SNPN. |
| 5-8 | Not used in this release of the specification, and may be ignored by UE if received.<br>Note: "this release" in this disclosure may include 3GPP Rel-17 and beyond. |

Two New Reserved Bits (e.g., the Fourth Bit and the Fifth Bit) in the Short Message Scheme:

Some implementations, for indicating the ETWS, may utilize a first new reserved bit (e.g., the fourth bit) in the short message. In some such implementations the first new reserved bit is set to '1', it represents the indication of an ETWS primary notification and/or an ETWS secondary notification and/or integrated ETWS notification in SNPN. If the first new reserved bit is set to '0', however, it may indicate that there is no ETWS primary notification, no ETWS secondary notification, and no integrated ETWS notification in SNPN. The CMAS indication may utilize a second new reserved bit (e.g., the fifth bit) in the short message. If the second new reserved bit is set to '1', it represents the indication of a CMAS notification in SNPN. If the second new reserved bit is, however, set to '0', it may indicate that there is no CMAS notification in SNPN. Table 3 below illustrates the ETWS indication and the CMAS indication in this scheme.

The UE in SNPN AM (e.g., as defined in 3GPP Release 17 and/or beyond), with/without a selected or registered SNPN, may acquire the system information blocks related to ETWS (e.g., the first system information block, the second system information block, the fourth system information block), from the cell transmitting the short message, after the UE receives the first new reserved bit as V. The UE in SNPN AM (e.g., as defined in 3GPP Release 17 and/or beyond), with/without a selected or registered SNPN, may not acquire the system information blocks related to ETWS, from the cell transmitting the short message, after the UE receives the first new reserved bit as '0'. The UE in SNPN AM (e.g., as defined in 3GPP Release 17 and/or beyond), with/without a selected or registered SNPN, may acquire the system information blocks related to CMAS (e.g., the third system information block, the fifth system information block), from the cell transmitting the short message, after the UE receives the second new reserved bit as '1'. The UE in SNPN AM (e.g., as defined in 3GPP Release 17 and/or beyond), with/without a selected or registered SNPN, may not acquire the system information blocks related to CMAS, from the cell transmitting the short message, after the UE receives the second new reserved bit as '0'.

The UE that is not in SNPN AM (e.g., as defined in 3GPP Release 17 and/or beyond), with/without a selected or registered PLMN, may not receive (or may receive, but ignore) the first new reserved bit and the second new reserved bit in the short message.

The UE that is not in SNPN AM (e.g., as defined in 3GPP Release 17 and/or beyond), with/without a selected or registered PLMN, may acquire the system information blocks related to ETWS (e.g., the first system information block, the second system information block, the fourth system information block), from the cell transmitting the short message, after the UE receives the first new reserved bit as '1'. The UE that is not in SNPN AM (e.g., as defined in 3GPP Release 17 and/or beyond), with/without a selected or registered PLMN, may not acquire the system information blocks related to ETWS (e.g., the first system information block, the second system information block, the fourth system information block), from the cell transmitting the short message, after the UE receives the first new reserved bit as '0'. The UE that is not in SNPN AM (e.g., as defined in 3GPP Release 17 and/or beyond), with/without a selected or registered PLMN, may acquire the system information block related to CMAS (e.g., the third system information block, the fifth system information block), from the cell transmitting the short message, after the UE receives the second new reserved bit as '1'. The UE that is not in SNPN AM (e.g., as defined in 3GPP Release 17 and/or beyond), with/without a selected or registered PLMN, may not acquire the system information block related to CMAS (e.g., the third system information block, the fifth system information block), from the cell transmitting the short message, after the UE receives the second new reserved bit as '0'.

The UE that only supports ETWS (e.g., an ETWS-capable UE which is not CMAS-capable), and in SNPN AM, with/without a selected or registered SNPN, may acquire the system information blocks related to ETWS (e.g., the first system information block, the second system information block, the fourth system information block), from the cell transmitting the short message, after the UE receives the first new reserved bit as '1'. The UE that only supports ETWS (e.g., an ETWS-capable UE which is not CMAS-capable), and in SNPN AM, with/without a selected or registered SNPN, may not acquire the system information blocks related to ETWS (e.g., the first system information block, the second system information block, the fourth system information block), from the cell transmitting the short message, after the UE receives the first new reserved bit as '0'. The UE that only supports ETWS (e.g., an ETWS-capable UE which is not CMAS-capable), and in SNPN AM, with/without a selected or registered SNPN, may receive but ignore the second new reserved bit. The UE that only supports ETWS (e.g., an ETWS-capable UE which is not CMAS-capable), and in SNPN AM, with/without a selected or registered SNPN, may not receive the second new reserved bit.

The UE that only supports ETWS (e.g., an ETWS-capable UE which is not CMAS-capable), and not in SNPN AM, with/without a selected or registered PLMN, may not receive (or may receive, but ignore) the first and second new reserved bits in the short message.

The UE that only supports ETWS (e.g., an ETWS-capable UE which is not CMAS-capable), and not in SNPN AM, with/without a selected or registered PLMN, may acquire the system information blocks related to ETWS (e.g., the first system information block, the second system information block, the fourth system information block), from the cell transmitting the short message, after the UE receives the first new reserved bit as '1'. The UE that only supports ETWS (e.g., an ETWS-capable UE which is not CMAS-capable), and not in SNPN AM, with/without a selected or registered PLMN, may not acquire the system information blocks related to ETWS (e.g., the first system information block, the second system information block, the fourth system information block), from the cell transmitting the short message, after the UE receives the new reserved bit as '0'. The UE that only supports ETWS (e.g., an ETWS-capable UE which is not CMAS-capable), and not in SNPN AM, with/without a selected or registered PLMN, may receive, but ignore the second reserved bit in the short message. The UE that only supports ETWS (e.g., an ETWS-capable UE which is not CMAS-capable), and not in SNPN AM, with/without a selected or registered PLMN, may not receive the second reserved bit in the short message.

The UE that only supports CMAS (e.g., a CMAS-capable UE which is not ETWS-capable), and in SNPN AM, with/without a selected or registered SNPN, may acquire the system information block related to CMAS (e.g., the third system information block, the fifth system information block), from the cell transmitting the short message, after the UE receives the second new reserved bit as '1'. The UE that only supports CMAS (e.g., a CMAS-capable UE which is not ETWS-capable), and in SNPN AM, with/without a selected or registered SNPN, may not acquire the system information block related to CMAS (e.g., the third system information block, the fifth system information block), from the cell transmitting the short message, after the UE receives the second new reserved bit as '0'. The UE that only supports CMAS (e.g., a CMAS-capable UE which is not ETWS-capable), and in SNPN AM, with/without a selected or registered SNPN, may receive, but ignore the first new reserved bit in the short message. The UE that only supports CMAS (e.g., a CMAS-capable UE which is not ETWS-capable), and in SNPN AM, with/without a selected or registered SNPN, may ignore the first new reserved bit in the short message.

The UE that only supports CMAS (e.g., a CMAS-capable UE which is not ETWS-capable), and that is not in SNPN AM, with/without a selected or registered PLMN, may not receive (or may receive, but ignore) the first and second new reserved bits in the short message.

The UE that only supports CMAS (e.g., a CMAS-capable UE which is not ETWS-capable), and not in SNPN AM, with/without a selected or registered PLMN, may acquire the system information block related to CMAS (e.g., the third system information block, the fifth system information block), from the cell transmitting the short message, after the UE receives the second new reserved bit as '1'. The UE that only supports CMAS (e.g., a CMAS-capable UE which is not ETWS-capable), and that is not in SNPN AM, with/without a selected or registered PLMN, may not acquire the system information block related to CMAS (e.g., the third system information block, the fifth system information block), from the cell transmitting the short message, after the UE receives the second new reserved bit as '0'. The UE that only supports CMAS (e.g., a CMAS-capable UE which is not ETWS-capable), and that is not in SNPN AM, with/without a selected or registered PLMN, may receive, but ignore the first new reserved bit in the short message. The UE that only supports CMAS (e.g., a CMAS-capable UE which is not ETWS-capable), and that is not in SNPN AM, with/without a selected or registered PLMN, may not receive the first new reserved bit in the short message.

The cell transmitting the short message including the first and second new reserved bit scheme may be a cell supporting (at least) one SNPN and/or a cell supporting (at least) one PLMN.

TABLE 3

Short message in two new reserved bits in the short message scheme

| Bit | Short Message |
|---|---|
| 1 | systemInfoModification<br>If set to 1: indication of a BCCH modification other than SIB6, SIB7, and SIB8. |
| 2 | etwsAndCmasIndication<br>If set to 1: indication of an ETWS primary notification and/or an ETWS secondary notification and/or a CMAS notification. |
| 3 | stopPagingMonitoring<br>This bit may be used for operations with shared spectrum channel access and when nrofPDCCH-MonitoringOccasionPerSSB-InPO is present.<br>If set to 1: indication that the UE may stop monitoring PDCCH occasion(s) for paging in this Paging Occasion as specified in 3GPP TS 38.304. |
| 4 | etwsindication<br>If set to 1: indication of an ETWS primary notification and/or an ETWS secondary notification and/or integrated ETWS notification in SNPN. |
| 5 | cmasIndication<br>If set to 1: indication of CMAS notification in SNPN. |
| 6-8 | Not used in this release of specification, and may be ignored by UE if received.<br>Note: "this release" here may refer to 3GPP Rel-17 and beyond. |

A New Reserved Bit (e.g., the Fourth Bit) for SNPN Indication in the Short Message Scheme:

Some implementations, for indicating the ETWS and/or CMAS for SNPN may utilize a third new reserved bit (e.g., the fourth bit) in the short message. If the third new reserved bit is set to '1', it may represent that the second bit in the short message for indication of an ETWS primary notification and/or an ETWS secondary notification and/or a CMAS notification is valid for the SNPN. On the other hand, when the third new reserved bit is set to '0', it may represent that the second bit in the short message for indication of an ETWS primary notification and/or an ETWS secondary notification and/or a CMAS notification is not valid for the SNPN.

The UE in SNPN AM (e.g., as defined in 3GPP Release 17 and/or beyond), with/without a selected or registered SNPN, may further determine whether to acquire the system information blocks (or information elements) related to ETWS (for SNPN) and/or the system information block (or information elements) related to CMAS (for SNPN) based on the second bit in the short message, after the UE receives the third new reserved bit as '1'. The UE in SNPN AM (e.g., as defined in 3GPP Release 17 and/or beyond), with/without a selected or registered SNPN, may not determine whether to acquire the system information blocks (or information elements) related to ETWS (for SNPN) and/or the system information block (or information elements) related to CMAS (for SNPN), and therefore the UE may not acquire the system information blocks (or information elements) related to ETWS (for SNPN) and/or the system information block (or information elements) related to CMAS (for SNPN), from the cell transmitting the short message, after the UE receives the third new reserved bit as '0'.

The UE that is not in SNPN AM (e.g., as defined in 3GPP Release 17 and/or beyond), with/without a selected or registered PLMN, may receive, but ignore (or may not receive) the third new reserved bit in the short message.

The UE that is not in SNPN AM (e.g., as defined in 3GPP Release 17 and/or beyond), with/without a selected or registered PLMN, may further determine whether to acquire the system information blocks (or information elements) related to ETWS (for SNPN), and/or the system information block (or information elements) related to CMAS (for SNPN), based on the second hit in the short message, after the UE receives the third new reserved bit as '1'. The UE that is not in SNPN AM (e.g., as defined in 3GPP Release 17 and/or beyond), with/without a selected or registered PLMN, may not determine whether to acquire the system information blocks (or information elements) related to ETWS (for SNPN) and/or the system information block (or information elements) related to CMAS (for SNPN), and therefore the UE may not acquire the system information blocks (or information elements) related to ETWS (for SNPN) and/or the system information block (or information elements) related to CMAS (for SNPN), from the cell transmitting the short message, after the UE receives the third new reserved bit as '0'.

The UE that only supports ETWS (e.g., an ETWS-capable UE which is not CMAS-capable), and in SNPN AM, with/without a selected or registered SNPN, may further determine whether to acquire the system information blocks (or information elements) related to ETWS (for SNPN) based on the second bit in the short message, after the UE receives the third new reserved bit as V. The UE that only supports ETWS (e.g., an ETWS-capable UE which is not CMAS-capable), and in SNPN AM, with/without a selected or registered SNPN, may not determine whether to acquire the system information blocks (or information elements) related to ETWS (for SNPN), and therefore the UE may not acquire the system information blocks (or information elements) related to ETWS (for SNPN), from the cell transmitting the short message, after the UE receives the third new reserved bit as '0'.

The UE that only supports ETWS (e.g., an ETWS-capable UE which is not CMAS-capable), and that is not in SNPN AM, with/without a selected or registered PLMN, may not receive or may receive, but ignore the third new reserved bit in the short message.

The UE that only supports ETWS (e.g., an ETWS-capable UE which is not CMAS-capable), and not in SNPN AM, with/without a selected or registered SNPN, may further determine whether to acquire the system information blocks (or information elements) related to ETWS (for SNPN), based on the second bit in the short message, after the UE receives the third new reserved bit as '1'. The UE that only supports ETWS (e.g., an ETWS-capable UE which is not CMAS-capable), and that is not in SNPN AM, with/without a selected or registered SNPN, may not determine whether to acquire the system information blocks (or information elements) related to ETWS (for SNPN), and therefore the UE may not acquire the system information blocks (or information elements) related to ETWS (for SNPN), from the cell transmitting the short message, after the UE receives the third new reserved bit as '0'.

The UE that only supports CMAS (e.g., a CMAS-capable UE which is not ETWS-capable), and in SNPN AM, with/without a selected or registered SNPN, may further determine whether to acquire the system information block (or information elements) related to CMAS (for SNPN), based on the second bit in the short message, after the UE receives the third new reserved bit as '1'. The UE that only supports CMAS (e.g., a CMAS-capable UE which is not ETWS-capable), and in SNPN AM, with/without a selected or registered SNPN, may not determine whether to acquire the system information block (or information elements) related to CMAS (for SNPN), and therefore the UE may not acquire the system information block (or information elements) related to CMAS (for SNPN), from the cell transmitting the short message, after the UE receives the third new reserved bit as '0'.

The UE that only supports CMAS (e.g., a CMAS-capable UE which is not ETWS-capable), and that is not in SNPN AM, with/without a selected or registered PLMN, may not receive (or may receive, but ignore) the third new reserved bit in the short message.

The UE that only supports CMAS (e.g., a CMAS-capable UE which is not ETWS-capable), and that is not in SNPN AM, with/without a selected or registered PLMN, may further determine whether to acquire the system information block (or information elements) related to CMAS (for SNPN), based on the second bit in the short message, after the UE receives the third new reserved bit as '1'. The UE that only supports CMAS (e.g., a CMAS-capable UE which is not ETWS-capable), and that is not in SNPN AM, with/without a selected or registered PLMN, may not determine whether to acquire the system information block (or information elements) related to CMAS (for SNPN), and therefore the UE may not acquire the system information block (or information elements) related to CMAS (for SNPN), from the cell transmitting the short message, after the UE receives the third new reserved bit as '0'.

The cell transmitting the short message including the third new reserved bit scheme may be a cell supporting (at least) one SNPN and/or may be a cell supporting (at least) one PLMN.

TABLE 4

Short message in a new reserved bit for SNPN
indication in the short message scheme Bit  Short Message 1  systemInfoModification
   If set to 1: indication of a BCCH modification other than
   SIB6, SIB7, and SIB8.
2  etwsAndCmasIndication
   If set to 1: indication of an ETWS primary notification
   and/or an ETWS secondary notification and/or a CMAS notification.
3  stopPagingMonitoring
   This bit may be used for operations with shared spectrum channel
   access and when nrofPDCCH-MonitoringOccasionPerSSB-InPO
   is present.
   If set to 1: indication that the UE may stop monitoring PDCCH
   occasion(s) for paging in this Paging Occasion as specified in
   3GPP TS 38.304.
4  validEtwsAndCmasIndicationSNPN
   If set to 1: it represents the second bit in short message for the
   indication of an ETWS primary notification and/or an ETWS
   secondary notification and/or a CMAS notification is valid for SNPN.
5-8  Not used in this release of the 3GPP specification, and may
     be ignored by UE if received.
     Note: "this release" here refer to 3GPP Rel-17 and beyond.

In some implementations, the UE may receive the PWS indication in the short message (and the following SIB6/SIB7/SIB8 reception) even if the UE switches form the SNPN access mode to a non-SNPN access mode (e.g., the UE may receive one or more PLMN selection requests from the upper layers) or vice versa. In some implementations, the UE may be able to receive all the PWS-SIB segments (e.g., the SIB-segments of SIB7/SIB8) and re-assemble the whole PWS-SIB even if the UE switches from the SNPN access mode to a non-SNPN access mode, or vice versa, while the UE is collecting all the PWS-SIB segments.

In some implementations, during a PWS message reception procedure (e.g., the UE may initially be triggered to receive the SIB6/SIB7/SIB8 after receiving the short message with a PWS indication that is set to "1" or "true"), the UE (e.g., the RRC entity in the UE) may receive an SNPN selection request from the NAS layer when the UE has a selected/registered PLMN. Under such a condition, the UE may keep receiving the PWS messages broadcast by the serving cell (e.g., via SIB6/SIB7/SIB8) even after receiving the SNPN selection request from the upper layers (e.g., from the NAS layer of the UE).

In some implementations, the UE may resume the conventional PWS reception activity (e.g., monitoring the PWS indication bit in the short message during the Paging Occasions and the PWS) after the UE moves out of the SNPN access mode (e.g., the NAS layer of the UE side may switch out of the SNPN access mode or switch to a non-SNPN access mode or switch to a PLMN access mode). The NAS layer of the UE may then instruct the AS layer of the UE to implement a PLMN selection, for example, by sending a PLMN selection request to the RRC entity of the UE.

In some implementations, even a UE that is built and configured to support PWS message reception may still be disabled to read the PWS message, for example, when the UE is registers to (or has selected) an SNPN associated with an earlier technical specifications (e.g., a 3GPP Release-16 SNPN). In some implementations, a UE may receive the Release Number of the CN (or the SNPN) from an air link (e.g., via transmissions of a serving RAN, such as broadcasting system information). In some implementations, the UE may receive an indication or some assistance information to determine the release of a selected SNPN or to determine if a selected SNPN supports PWS messaging.

In some implementations, a cell may broadcast the information about whether a NW (e.g., an SNPN), which is supported by the cell, supports a PWS or not. Some implementations may provide the following two different approaches/mechanisms for the cell to indicate its support of the PWS: (1) one integrated bit approach, and (2) two separate bits approach:

One Integrated Bit Approach:

In some implementations, a cell may broadcast a first indicator, for example, as one bit, in a format of ENUMERATED {support}, or ENUMERATED {support, not support}, in system information (e.g., in SIB1 or in SNPN-related SIB, such as SIB10, or a new SIB). In some such implementations, if the first indicator is present and includes 'support', the cell may indicate that it supports a PWS function. On the other hand, if the first indicator is absent, or it includes 'not support', then the cell may indicate that it does not support any PWS function.

The UE that receives the first indicator set to 'support' may monitor the short message on paging occasions with P-RNTI to check whether there is an indication for ETWS and/or CMAS. For example, the UE that receives the first indicator set to 'support' may apply the proposed implementations in the present application when the UE supports 3GPP Release 17 and/or beyond, and/or supports the PWS, and/or has or does not have a selected or registered SNPN.

The UE receiving the first indicator set to 'not support' may monitor (and/or receive) the short message on paging occasions with P-RNTI but ignore PWS-related bits (if received) in the short message. The UE receiving the first indicator set to 'not support' may not receive the short message on paging occasions with P-RNTI. The UE receiving the first indicator set to 'not support' may not receive the PWS-related bits on paging occasions with P-RNTI. The PWS-related bits may be the second bit, the first new reserved bit, the second new reserved bit, the third new reserved bit, etc., when the UE supports 3GPP Release 17 and/or beyond, and/or supports the PWS, and/or has or does not have a selected or registered SNPN.

Additionally, a UE may ignore the received first indicator when the UE supports 3GPP Release 16 and/or prior, and/or does not support the PWS, and/or has or does not have a selected or registered SNPN.

One Integrated Bit Approach—Per PLMN/SNPN List:

In some implementations, a cell may broadcast a list of first indicators, where each indicator may be presented in a format of ENUMERATED {support} or ENUMERATED {support, not support}, in system information (e.g., in SIB1 or in SNPN-related SIB, such as SIB10, or a new SIB). Each first indicator may be associated with a network identity (e.g., PLMN ID, SNPN ID, NID) identifying a network that operates the cell. If the first indicator associated with a network identity is present and the indicator includes 'support', the cell may indicate that it supports a PWS function for the associated network identified. If the first indicator is absent though or includes 'not support', the cell may indicate that it does not support the PWS function for the associated network identified by the network identity.

In some implementations, a UE receiving a first indicator set to 'support', associated with the UE's selected or registered network identity, may monitor the short message on paging occasions with P-RNTI to check whether there is an indication for ETWS and/or CMAS. For example, the UE that receives the first indicator set to 'support' may apply the proposed implementations in this disclosure. The UE receiving the first indicator, not associated with the UE's selected or registered network identity, may ignore such a first indicator when the UE supports 3GPP Release 17 and/or beyond, and/or supports the PWS, and/or has or does not have a selected or registered SNPN.

If the UE without a selected or registered SNPN receives the list of the first indicators, the UE may act based on the first entry of the list of first indicators. If the first entry of the list is set to 'support', the UE may monitor the short message on paging occasions with P-RNTI to check whether there is an indication for ETWS and/or CMAS.

In some implementations, a UE receiving the first indicator set to 'not support', associated with the UE's selected or registered network identity, may monitor (and/or receive) the short message on paging occasions with P-RNTI, but may ignore the PWS-related bits (if received) in the short message. The UE receiving the first indicator set to 'not support', associated with the UE's selected or registered network identity, may not receive the short message on paging occasions with P-RNTI. The UE receiving the first indicator set to 'not support', associated with the UE's selected or registered network identity, may not receive (or may ignore) the PWS-related bits on paging occasions with P-RNTI. The PWS-related bits may be the second bit, the first new reserved bit, the second new reserved bit, the third new reserved bit, etc., when the UE supports 3GPP Release 17 and/or beyond, and/or supports the PWS, and/or has or does not have a selected or registered SNPN.

If the UE without a selected or registered SNPN receives the list of the first indicators, the UE may act based on the first entry of the list of first indicators. If the first entry of the list is set to 'not support' or absent, the UE may not monitor the short message on paging occasions with P-RNTI, or the UE may monitor the short message on paging occasions with P-RNTI, but may ignore the PWS-related bits (if received) in the short message.

In some implementations, the UE may ignore the received list of first indicators when the UE supports 3GPP Release 16 and/or prior, and/or does not support the PWS, and/or has or does not have a selected or registered SNPN.

One Integrated Bit Approach—Per PLMN/SNPN Bit String:

In some implementations, a cell may broadcast a first bit string (e.g., a bit map) where each bit may be a first indicator, e.g., as one bit, in system information (e.g., in SIB1 or in SNPN-related SIB, such as SIB10, or a new SIB). Each first indicator may be associated with a network identity (e.g., PLMN ID, SNPN ID, NID) identifying a network that operates the cell. The (maximum) total number of the first bit string may be the maximum number of networks that may operate a cell (e.g., 12 networks). Each bit in the first bit string (e.g., from the most significant bit to the least significant bit, or from the least significant bit to the most significant bit) may associate with a network entry in the list of network identities in SIB1 (e.g., from the first entry to the last entry). If the first indicator associated with a network identity is present and the bit is set to '1', the cell may indicate that it supports the PWS function for the associated network (e.g., identified by the network identity). If the first indicator is absent or the bit is set to '0', the cell may indicate that it does not support the PWS function for the associated network (e.g., identified by the network identity).

In some implementations, a UE receiving the first indicator set to '1', associated with the UE's selected or registered network identity, may monitor the short message on paging occasions with P-RNTI to check whether there is an indication for ETWS and/or CMAS. For example, the UE that receives the first indicator set to '1' may apply the proposed implementations in this disclosure. On the other hand, aUE receiving the first indicator, that is not associated with the UE's selected or registered network identity, may ignore such a first indicator when the UE supports 3GPP Release 17 and/or beyond, and/or supports the PWS, and/or has or does not have a selected or registered SNPN.

If the UE without a selected or registered SNPN receives the first bit string, the UE may act based on the most significant bit of the first bit string, the least significant bit of the first bit string, or the first indicator in the bit string associated with the first entry of the list of the network identity. If the most significant bit of the first bit string, the least significant bit of the first bit string, or the first indicator in the bit string associated with the first entry of the list of the network identity is set to '1', the UE may monitor the short message on paging occasions with P-RNTI to check whether there is an indication for ETWS and/or CMAS.

In some implementations, a receiving the first indicator set to '0', associated with the UE's selected or registered network identity, may monitor (and/or receive) the short message on paging occasions with P-RNTI, but may ignore the PWS-related bits (if received) in the short message. The UE receiving the first indicator set to '0', associated with the UE's selected or registered network identity, may not receive the short message on paging occasions with P-RNTI. The UE receiving the first indicator set to '0', associated with the UE's selected or registered network identity, may not receive (or may ignore) the PWS-related bits on paging occasions with P-RNTI. The PWS-related bits may be the second bit, the first new reserved bit, the second new reserved bit, the third new reserved bit, etc., when the UE supports 3GPP Release 17 and/or beyond, and/or supports the PWS, and/or has or does not have a selected or registered SNPN.

If the UE without a selected or registered SNPN receives the first bit string, the UE may act based on the most significant bit of the first bit string, the least significant bit of the first bit string, or the first indicator in the bit string associated with the first entry of the list of the network identities. If the most significant bit of the first bit string, the least significant bit of the first bit string, or the first indicator in the bit string associated with the first entry of the list of the network identities is set to 'not support' or absent, the UE may not monitor the short message on paging occasions with P-RNTI, or the UE may monitor the short message on paging occasions with P-RNTI, but may ignore the PWS-related bits (if received) in the short message.

The UE may ignore the received first bit string when the UE supports 3GPP Release 16 and/or prior, and/or does not support the PWS, and/or has or does not have a selected or registered SNPN.

Two Separate Bits Approach:

In some implementations, a cell may broadcast a second indicator, e.g., as one bit, in a format of ENUMERATED {support} or ENUMERATED {support, not support} in system information (e.g., in SIB1 or in SNPN-related SIB, such as SIB10, or a new SIB). If the second indicator is present and includes 'support', the cell indicates that it supports the ETWS function. If the second indicator is absent, or 'not support', the cell indicates that it does not support the ETWS function.

In some implementations, a UE receiving the second indicator set to 'support' may monitor the short message on paging occasions with P-RNTI to check whether there is an indication for ETWS. For example, the UE that receives the second indicator set to 'support' may apply the proposed implementations in this disclosure when the UE supports 3GPP Release 17 and/or beyond, and/or supports the PWS, and/or is ETWS-capable, and/or has or does not have a selected or registered SNPN.

In some implementations, a UE receiving the second indicator set to 'not support' may monitor (and/or receive) the short message on paging occasions with P-RNTI, but may ignore the ETWS-related bits (if received) in the short message. The UE receiving the second indicator set to 'not support' may not receive the short message on paging occasions with P-RNTI. The UE receiving the second indicator set to 'not support' may not receive (or may ignore) the ETWS-related bits on paging occasions with P-RNTI. The ETWS-related bits may be the second bit, the first new reserved bit, the second new reserved bit, the third new reserved bit, etc., when the UE supports 3GPP Release 17 and/or beyond, and/or supports the PWS, is ETWS-capable, and/or has or does not have a selected or registered SNPN In some implementations, the UE may ignore the received second indicator when the UE supports 3GPP Release 16 and/or prior, and/or does not support the PWS, and/or is not ETWS-capable, and/or has or does not have a selected or registered SNPN.

In some implementations, a cell may broadcast a third indicator, e.g., as one bit, in a format of ENUMERATED {support} or ENUMERATED {support, not support} in system information (e.g., in SIB1 or in SNPN-related SIB, such as SIB10, or a new SIB). If the third indicator is present and includes 'support', the cell indicates that it supports the CMAS function. If the third indicator is absent, or includes 'not support', the cell indicates that it does not support the CMAS function.

In some implementations, a UE receiving the third indicator set to 'support' may monitor the short message on paging occasions with P-RNTI to check whether there is an indication for CMAS. For example, the UE that receives the third indicator set to 'support' may apply the proposed implementations in this disclosure when the UE supports 3GPP Release 17 and/or beyond, and/or supports the PWS, and/or is CMAS-capable, and/or has or does not have a selected or registered SNPN.

In some implementations, a UE receiving the third indicator set to 'not support' may monitor (and/or receive) the short message on paging occasions with P-RNTI, but may ignore the CMAS-related bits (if received) in the short message. The UE receiving the third indicator set to 'not support' may not receive the short message on paging occasions with P-RNTI. The UE receiving the third indicator set to 'not support' may not receive (or may ignore) the CMAS-related bits on paging occasions with P-RNTI. The CMAS-related bits may be the second bit, the first new reserved bit, the second new reserved bit, the third new reserved bit, etc., when the UE supports 3GPP Release 17 and/or beyond, and/or supports the PWS, and/or is CMAS-capable, and/or has or does not have a selected or registered SNPN.

The UE may ignore the received third indicator when the UE supports 3GPP Release 16 and/or prior, and/or does not support the PWS, and/or is not CMAS-capable, and/or has or does not have a selected or registered SNPN.

Two Separate Bits Approach—Per PLMN/SNPN List:

In some implementations, a cell may broadcast a list of second indicators, where each indicator may be presented in a format of ENUMERATED {support} or ENUMERATED {support, not support}, in system information (e.g., in SIB1 or in SNPN-related SIB, such as SIB10, or a new SIB). Each second indicator may be associated with a network identity (e.g., PLMN ID, SNPN ID, NID) identifying a network that operates the cell. If the second indicator associated with a network identity is present and it includes 'support', the cell indicates that it supports the ETWS function for the associated network identified by the network identity. If the second indicator is absent or includes 'not support', the cell indicates that it does not support the ETWS function for the associated network identified by the network identity.

In some implementations, a UE receiving the second indicator set to 'support', associated with the UE's selected or registered network identity, may monitor the short message on paging occasions with P-RNTI to check whether there is an indication for ETWS. For example, the UE that receives the second indicator set to 'support' may apply the proposed implementations in this disclosure. The UE receiving the second indicator, that is not associated with the UE's selected or registered network identity, may ignore such a second indicator when the UE supports 3GPP Release 17 and/or beyond, and/or supports the PWS, and/or is ETWS-capable, and/or has or does not have a selected or registered SNPN.

If the UE that is without a selected or registered SNPN receives the list of the second indicators, the UE may act based on the first entry of the list of second indicators. If the first entry of the list is set to 'support', the UE may monitor the short message on paging occasions with P-RNTI to check whether there is an indication for ETWS.

In some implementations, a UE receiving the second indicator set to 'not support', associated with the UE's selected or registered network identity, may monitor (and/or receive) the short message on paging occasions with P-RNTI, but may ignore the ETWS-related bits (if received) in the short message. The UE receiving the second indicator set to 'not support', associated with the UE's selected or registered network identity, may not receive the short message on paging occasions with P-RNTI. The UE receiving the second indicator set to 'not support', associated with the UE's selected or registered network identity, may not receive (or may ignore) the ETWS-related bits on paging occasions with P-RNTI. The ETWS-related bits may be the second bit, the first new reserved bit, the second new reserved bit, the third new reserved bit, etc., when the UE supports 3GPP Release 17 and/or beyond, and/or supports the PWS, and/or is ETWS-capable, and/or has or does not have a selected or registered SNPN.

If the UE that is without a selected or registered SNPN receives the list of the second indicators, the UE may act based on the first entry of the list of second indicators. If the first entry of the list is set to 'not support' or absent, the UE may not monitor the short message on paging occasions with P-RNTI, or the UE may monitor the short message on paging occasions with P-RNTI, but may ignore the PWS-related bits (if received) in the short message.

In some implementations, the UE may ignore the received list of second indicators when the UE supports 3GPP Release 16 and/or prior, and/or does not support the PWS, and/or is not ETWS-capable, and/or has or does not have a selected or registered SNPN.

In some implementations, a cell may broadcast a list of third indicators, where each indicator may be presented in a format of ENUMERATED {support} or ENUMERATED {support, not support}, in system information (e.g., in SIB 1 or in SNPN-related SIB, such as SIB10, or a new SIB). Each third indicator may be associated with a network identity (e.g., PLMN ID, SNPN ID, NID) identifying a network that operates the cell. If the third indicator is present and includes 'support', the cell indicates that it supports a CMAS function for the associated network identified by the network identity. If the third indicator is absent or includes 'not support', the cell indicates that it does not support the CMAS function for the associated network identified by the network identity.

In some implementations, a UE receiving the third indicator set to 'support', associated with the UE's selected or registered network identity, may monitor the short message on paging occasions with P-RNTI to check whether there is an indication for CMAS. For example, the UE receives the third indicator set to 'support' may apply the proposed implementations in this disclosure. The UE receiving the third indicator, that is not associated with the UE's selected or registered network identity, may ignore such a third indicator when the UE supports 3GPP Release 17 and/or beyond, and/or supports the PWS, and/or is CMAS-capable, and/or has or does not have a selected or registered SNPN.

If the UE that is without a selected or registered SNPN receives the list of third indicators, the UE may act based on the first entry of the list of third indicators. If the first entry of the list is set to 'support', the UE may monitor the short message on paging occasions with P-RNTI to check whether there is an indication for CMAS.

In some implementations, a UE receiving the third indicator set to 'not support', associated with the UE's selected or registered network identity, may monitor (and/or receive) the short message on paging occasions with P-RNTI, but may ignore the CMAS-related bits (if received) in the short message. The UE receiving the third indicator set to 'not support', associated with the UE's selected or registered network identity, may not receive the short message on paging occasions with P-RNTI. The UE receiving the third indicator set to 'not support', associated with the UE's selected or registered network identity, may not receive (or may ignore) the CMAS-related bits on paging occasions with P-RNTI. The CMAS-related bits may be the second bit, the first new reserved bit, the second new reserved bit, the third new reserved bit, etc., when the UE supports 3GPP Release 17 and/or beyond, and/or supports the PWS, and/or is CMAS-capable, and/or has or does not have a selected or registered SNPN.

If the UE that is without a selected or registered SNPN receives the list of the third indicators, the UE may act based on the first entry of the list of third indicators. If the first entry of the list is set to 'not support' or absent, the UE may not monitor the short message on paging occasions with P-RNTI, or the UE may monitor the short message on paging occasions with P-RNTI, but may ignore the PWS-related bits (if received) in the short message.

In some implementations, the UE may ignore the received list of third indicators when the UE supports 3GPP Release 16 and/or prior, and/or does not support the PWS, and/or is not CMAS-capable, and/or has or does not have a selected or registered SNPN.

Two Separate Bits Approach—Per PLMN/SNPN Bit String:

In some implementations, a cell may broadcast a second bit string (e.g., a bit map) where each bit may be a second indicator, e.g., as one bit, in system information (e.g., in SIB1 or in SNPN-related SIB, such as SIB10, or a new SIB). Each second indicator may be associated with a network identity (e.g., PLMN ID, SNPN ID, NID) identifying a network that operates the cell. The (maximum) total number of the second bit strings may be the maximum number of networks that may operate a cell (e.g., 12 networks). Each bit in the second bit string (e.g., from the most significant bit to the least significant bit, from the least significant bit to the most significant bit) may associate with a network entry in the list of network identities in SIB1 (e.g., from the first entry to the last entry). If the second indicator associated with a network identity is present and includes '1', the cell indicates that it supports an ETWS function for the associated network identified by the network identity. If the second indicator is absent or includes '0', the cell indicates that it does not support the ETWS function for the associated network identified by the network identity.

In some implementations, a UE receiving the second indicator set to '1', associated with the UE's selected or registered network identity, may monitor the short message on paging occasions with P-RNTI to check whether there is an indication for ETWS. For example, the UE receives the second indicator set to '1' may apply the proposed implementations in this disclosure. The UE receiving the second indicator, that is not associated with the UE's selected or registered network identity, may ignore such a second indicator when the UE supports 3GPP Release 17 and/or beyond, and/or supports the PWS, and/or is ETWS-capable, and/or has or does not have a selected or registered SNPN.

If the UE that is without a selected or registered SNPN receives the second bit string, the UE may act based on the most significant bit of the second bit string, the least significant bit of the second bit string, or the second indicator in the bit string associated with the first entry of the list of the network identities. If the most significant bit of the second bit string, the least significant bit of the second bit string, or the second indicator in the bit string associated with the first entry of the list of the network identity is set to '1', the UE may monitor the short message on paging occasions with P-RNTI to check whether there is an indication for ETWS.

In some implementations, a UE receiving the second indicator set to '0', associated with the UE's selected or registered network identity, may monitor (and/or receive) the short message on paging occasions with P-RNTI, but may ignore the ETWS-related bits (if received) in the short message. The UE receiving the second indicator set to '0', associated with the UE's selected or registered network identity, may not receive the short message on paging occasions with P-RNTI. The UE receiving the second indicator set to '0', associated with the UE's selected or registered network identity, may not receive (or may ignore) the ETWS-related bits on paging occasions with P-RNTI. The ETWS-related bits may be the second bit, the first new reserved bit, the second new reserved bit, the third new reserved bit, etc., when the UE supports 3GPP Release 17 and/or beyond, and/or supports the PWS, and/or is ETWS-capable, and/or has or does not have a selected or registered SNPN.

If the UE that is without a selected or registered SNPN receives the second bit string, the UE may act based on the most significant bit of the first bit string, the least significant bit of the first bit string, or the first indicator in the bit string associated with the first entry of the list of the network identities. If the most significant bit of the first bit string, the least significant bit of the first bit string, or the first indicator in the bit string associated with the first entry of the list of the network identity is set to '0' or absent, the UE may not monitor the short message on paging occasions with P-RNTI, or the UE may monitor the short message on paging occasions with P-RNTI, but may ignore the ETWS-related bits (if received) in the short message.

In some implementations, the UE may ignore the received second bit string when the UE supports 3GPP Release 16 and/or prior, and/or does not support the PWS, and/or is not ETWS-capable, and/or has or does not have a selected or registered SNPN.

In some implementations, a cell may broadcast a third bit string (e.g., a bit map), where each bit may be a second indicator, e.g., as one bit, in system information (e.g., in SIB1 or in SNPN-related SIB, such as SIB10, or a new SIB). Each third indicator may be associated with a network identity (e.g., PLMN ID, SNPN ID, NID) identifying a network that operates the cell. The (maximum) total number of the third bit string may be the maximum number of networks that may operate a cell (e.g., 12 networks). Each bit in the third bit string (e.g., from the most significant bit to the least significant bit, from the least significant bit to the most significant bit) may associate with a network entry in the list of network identities in SIB1 (e.g., from the first entry to the last entry). If the third indicator associated with a network identity is present and includes '1', the cell indicates that it supports the CMAS function for the associated network identified by the network identity. If the third indicator is absent or includes '0', the cell indicates that it does not support the CMAS function for the associated network identified by the network identity.

In some implementations, a UE receiving the third indicator set to '1', associated with the UE's selected or registered network identity, may monitor the short message on paging occasions with P-RNTI to check whether there is an indication for CMAS. For example, the UE that receives the third indicator set to '1' may apply the proposed implementations in this disclosure. The UE receiving the third indicator, that is not associated with the UE's selected or registered network identity, may ignore such a third indicator when the UE supports 3GPP Release 17 and/or beyond, and/or supports the PWS, and/or is CMAS-capable, and/or has or does not have a selected or registered SNPN.

If the UE that is without a selected or registered SNPN receives the third bit string, the UE may act based on the most significant bit of the second bit string, the least significant bit of the second bit string, or the second indicator in the bit string associated with the first entry of the list of the network identities. If the most significant bit of the second bit string, the least significant bit of the second bit string, or the second indicator in the bit string associated with the first entry of the list of the network identities is set to '1', the UE may monitor the short message on paging occasions with P-RNTI to check whether there is an indication for CMAS.

In some implementations, a UE receiving the third indicator set to '0', associated with the UE's selected or registered network identity, may monitor (and/or receive) the short message on paging occasions with P-RNTI, but may ignore the CMAS-related bits (if received) in the short message. The UE receiving the third indicator set to '0', associated with the UE's selected or registered network identity, may not receive the short message on paging occasions with P-RNTI. The UE receiving the third indicator set to '0', associated with the UE's selected or registered network identity, may not receive (or may ignore) the CMAS-related bits on paging occasions with P-RNTI. The CMAS-related bits may be the second bit, the first new reserved bit, the second new reserved bit, the third new reserved bit, etc., when the UE supports 3GPP Release 17 and/or beyond, and/or supports the PWS, and/or is CMAS-capable, and/or has or does not have a selected or registered SNPN.

If the UE that is without a selected or registered SNPN receives the third bit string, the UE may act based on the most significant bit of the first bit string, the least significant bit of the first bit string, or the first indicator in the bit string associated with the first entry of the list of the network identities. If the most significant bit of the first bit string, the least significant bit of the first bit string, or the first indicator in the bit string associated with the first entry of the list of the network identity is set to '0' or absent, the UE may not monitor the short message on paging occasions with P-RNTI, or the UE may monitor the short message on paging occasions with P-RNTI, but may ignore the CMAS-related bits (if received) in the short message.

In some implementations, the UE may ignore the received third bit string when the UE supports 3GPP Release 16 and/or prior, and/or does not support the PWS, and/or is not CMAS-capable, and/or has or does not have a selected or registered SNPN.

In some implementations, a UE may still be disabled for monitoring the PWS indication bit in the short message and/or the PWS messages (e.g., via the broadcasting of SIB6/SIB7/SIB8). For example, if the UE stays in a "Camped on Any Cell" state, the upper layers of the UE may instruct/configure the types of the "limited services" which should/may be accessed/realized by the UE. In some implementations, the limited services may include any combinations of {emergency (call) services, PWS}. As such, in some implementations, the UE may (only) be configured with PWS for the limited services, which means the UE is configured/allowed to implement (only) PWS as the "limited services." In some other implementations, the UE may (only) be configured with emergency (call) services for the limited services, which means the UE is configured/allowed to implement (only) emergency (call) services as the "limited services." In some other implementations, the UE may be configured with both PWS & emergency (call) services for the limited services, which means the UE is configured/allowed to implement both emergency (call) services as the "limited services." In some other implementations, the UE may not be configured with any types of limited services (e.g., neither emergency (call) services nor PWS) and, as such, the UE may not be allowed to implement the PWS or the emergency (call) services.

It should be noted that the upper layers may make the decision based on the types of selected/registered NWs (e.g., SNPN/PLMN/PNI-NPN). In some implementations, for the upper layers of the UE, the UE may decide not to implement the PWS by skipping/ignoring the PWS messages received by the lower layers (e.g., the AS layer) of the UE. In some implementations, such NAS layer instructions may be provided by the NAS layer to the AS layer (e.g., through the RRC entity) with the SNPN selection request.

In some implementations, based on different combinations of "limited services types," the UE may have different behavior over PWS related procedures and emergency (call) services. For example, if the UE is in a limited services type 'PWS only', the UE may (only) perform PWS related procedures, but may not perform emergency (call) service related procedures. In another example, if the UE is in a limited services type 'Emergency Service only', the UE may (only) perform Emergency service related procedures, but may not perform PWS related procedures. Therefore, in some implementations, after receiving the instructions from the NAS layer, the RRC entity (e.g., of the UE) may implement the SNPN selection and cell (re)selection procedures differently.

In some implementations, the NAS layer of the UE may instruct the AS layer of the UE what the priorities of SNPN(s) for performing SNPN selection should be. In some such implementations, after receiving the different SNPN priority rules from the NAS layer, (the AS layer of) the UE may search for high priority SNPN(s) (or the highest priority SNPN) (continuously) during a cell (re)selection procedure. In some implementations, the SNPN priorities may be configured based on the (support) 'limited services types' associated with the SNPN (e.g., PWS (only), emergency service (only), PWS and Emergency service). For example, the SNPN, which supports both PWS and emergency (call) services, may be configured as a high priority NW in comparison with a NW that supports only PWS/emergency (call) services.

In some implementations, a UE with UE's (NPN) credentials owned by a separate entity other than the SNPN (e.g., a third party) may acquire SIB6 for the primary notification of the ETWS, acquire SIB7 for the secondary notification of the ETWS, and/or acquire SIB8 for the warning notification of the CMAS, when the cell operated by the SNPN broadcasts an indication of access using credentials from the separate entity (e.g., the credential owner). However, when the cell operated by the SNPN does not broadcast an indication of access using credentials from the separate entity (e.g., the indication is absent), the UE with UE's (NPN) credentials owned by the separate entity (e.g., other than the SNPN) may not acquire SIB6 for the primary notification of the ETWS, may not acquire SIB7 for the secondary notification of the ETWS, and/or may not acquire SIB8 for the warning notification of the CMAS. When the cell operated by the SNPN broadcasts an indication of access using credentials from the separate entity (e.g., the indication is present, but set to "not support"), the UE with UE's (NPN) credentials owned by the separate entity other than the SNPN may not acquire SIB6 for the primary notification of the ETWS, may not acquire SIB7 for the secondary notification of the ETWS, and/or may not acquire SIB8 for the warning notification of the CMAS.

In some implementations, a UE with UE's (NPN) credentials owned by a separate entity other than the SNPN may acquire SIB6 for the primary notification of the ETWS, acquire SIB7 for the secondary notification of the ETWS, and/or acquire SIB8 for the warning notification of the CMAS, irrespective of the cell operated by the SNPN broadcasting an indication of access using credentials from a separate entity (e.g., a credential owner), and irrespective of the content of the indication of access using credentials from the separate entity. The UE with UE's (NPN) credentials owned by a separate entity may acquire SIB6 for the primary notification of the ETWS, acquire SIB7 for the secondary notification of the ETWS, and/or acquire SIB8 for the warning notification of the CMAS, while ignoring the indication of access using credentials from the separate entity (e.g., a credential owner), if received from the cell operated by the SNPN.

In some implementations, a UE with UE's (NPN) credentials owned by a separate entity other than the SNPN may not acquire SIB6 for the primary notification of the ETWS, may not acquire SIB7 for the secondary notification of the ETWS, and/or may not acquire SIB8 for the warning notification of the CMAS, irrespective of the cell operated by the SNPN broadcasting an indication of access using credentials from the separate entity (e.g., a credential owner), and irrespective of the content of the indication of access using credentials from the separate entity. The UE with UE's (NPN) credentials owned by a separate entity other than the SNPN may not acquire SIB6 for the primary notification of the ETWS, may not acquire SIB7 for the secondary notification of the ETWS, and/or may not acquire SIB8 for the warning notification of the CMAS, while ignoring the indication of access using credentials from a separate entity, if received from the cell operated by the SNPN.

It should be noted that, in some implementations, the definition of an ETWS-capable/CMAS-capable UE may be changed based on the SNPN access mode. For example, in the present implementations, a UE may be PWS-capable and at the same time the UE may be ETWS-capable and/or CMAS-capable. In some other implementations, the definition of an ETWS-capable/CMAS-capable UE may be decided based on, for example, the 3GPP technical specification. In some additional implementations, the UE may be configured as an ETWS-capable/CMAS-capable/emergency (call) services-capable UE based on the instructions received from the upper layers (e.g., the NAS layer).

In some implementations, a UE (e.g., a UE implemented based on the 3GPP Release-16 protocols) may not be PWS-capable. Such a UE may receive an SNPN selection request message from the NAS layer. In some implementations, the NAS layer of the UE may decide whether the UE is PWS-capable (e.g., ETWS-capable and/or CMAS-capable based on whether the UE is operating in an SNPN-access mode) and then the NAS layer may inform/instruct/configure the AS layer (e.g., via the RRC entity of the UE) whether the UE is PWS-capable or not. In some implementations, whether the UE is PWS-capable or not may or may not influence the UE to select/register with a private NW (e.g., SNPN or PNI-NPN).

In some implementations, the UE may be PWS-capable if the selected SNPN (or registered SNPN) supports PWS (e.g., 3GPP Release-17 SNPN). Otherwise, the UE may not be PWS-capable.

In some implementations, a UE (which is operating in an SNPN access mode) in RRC_INACTIVE state/RRC_IDLE state may implement a cell reselection procedure, for example, from a cell #1 to a cell #2. In addition, the UE may be triggered to receive a PWS message on cell #1 before the UE decides to move to cell #2 and the UE may still be monitoring the PWS (e.g., SIB6/SIB7/SIB8) before the cell reselection is initiated/triggered. However, in some implementations, cell #2 may not support PWS message delivery since cell #2 may only support SNPN networks that do not support PWS. Under such a condition the PWS message reception procedure may be interrupted. To solve this issue, the UE of some of the present implementations may not move to cell #2, unless the UE has obtained a valid PWS message(s) (e.g., via SIB6/SIB7/SIB8) from cell #1 successfully. The UE of some such implementations may temporarily treat the frequency carrier and the serving cell #1 as the highest priority frequency carrier (and the highest priority cell) during the PWS message reception procedure.

Figure 2:
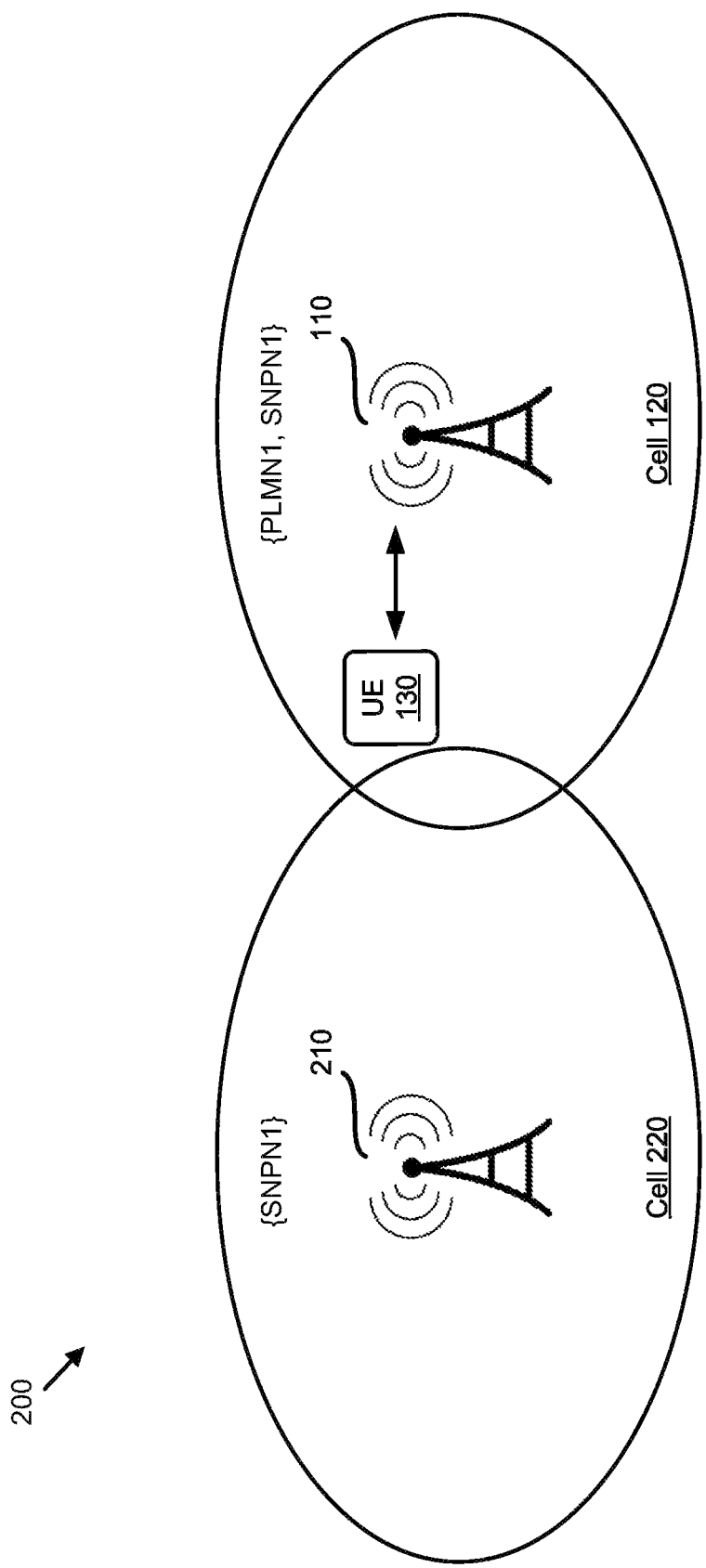
FIG. 2 is a diagram illustrating a UE performing a conditional handover procedure while receiving PWS messages, according to an example implementation of the present application.

In some implementations, a UE may receive conditional handover instructions from its serving cell for the UE to trigger a handover procedure while (at least) one of the pre-configured measurement results is fulfilled. FIG. 2 is a diagram 200 illustrating a UE 130 performing a conditional handover procedure while receiving PWS messages, according to an example implementation of the present application.

As shown in FIG. 2, UE 130 may receive a conditional handover command (e.g., via an RRCReconfiguration message with an information element indicating a conditional reconfiguration) from BS 110, while cell 120 is the serving cell (e.g., primary cell) of UE 130. In addition, in the conditional handover command, UE 130 may be configured with a conditional reconfiguration and triggering conditions (e.g., via a measurement event A3/A5) associated with cell 220. In some implementations, under a RAN sharing scenario, different Base Stations may be configured to support different types of NWs. For example, as shown in FIG. 2, BS 110 may support {PLMN1, SNPN1} under a RAN sharing condition, while BS 210 (associated with cell 220) may only support {SNPN1}. In the example shown in FIG. 2, the UE may have been registered with SNPN1, which does not support a PWS message delivery mechanism. However, based on the 3GPP technical specification, UE 130 may still be able to receive a PWS indication via the short message reception and the SIB6/SIB7/SIB8 while the UE is connected with cell 120 (which is configured by BS 110). This condition may happen while the PLMN1 supports PWS message delivery and the UE (that is registered with SNPN1 but is still PWS-capable) may still be able to receive the PWS message (e.g., UE may still be able to monitor the PWS indication via short message monitoring and receive the SIB6/SIB7/SIB8 broadcast by the BS 110) transmitted by BS 110/cell 120 under the RAN sharing condition. In some implementations, UE 130 may still be able to trigger a handover procedure (e.g., based on the RRCReconfiguration message having the conditionalReconfiguration and triggering conditions associated with cell 220) to move to cell 220/BS 210, while the UE may also be reading SIB6/SIB7/SIB8 (e.g., before UE 130 was able to assemble/decode the PWS message successfully). Therefore, under such a condition, the handover procedure may interrupt the PWS message reception procedure of UE 130 if SNPN1 does not support the PWS.

As described above, to solve the above-described issue, in some implementations, the UE may not trigger the (conditional) handover procedure to move to cell 220 if the UE is triggered to receive SIB6/SIB7/SIB8, and UE 130 was still not able to assemble/decode/obtain a valid PWS (e.g., via SIB6/SIB7/SIB8) even if the triggering condition associated with cell 220 is already fulfilled based on UE's measurement results. As such, the UE may postpone the handover procedure to switch to cell 220 (e.g., the UE may not start the contention-free random access/contention-based random access procedure by transmitting a selected/configured preamble to cell 220) if the UE is receiving the (whole) PWS message from cell 120. In addition, UE 130 may start the contention-free RA procedure or contention-based RA procedure associated with cell 220 only when the UE has received the PWS message from cell 120 successfully. Please also note that the proposed mechanisms/implementations may also be applicable when the PLMN1 in FIG. 2 is replaced by another non-public network (e.g., an SNPN2) that supports the PWS.

It should also be noted that, in some implementations, UE 130 may consider cell 110 as having the highest priority before the UE decodes the PWS message successfully and forward the PWS messages to the upper layer.

In some implementations, to postpone the (conditional) handover decision on the UE side, an offset of DL-RSRP value may be configured to the UE, such that the UE may postpone the (conditional) handover procedure to a target cell (e.g., UE may add a DL-RSRP offset value (e.g., a positive value) to the original DL-RSRP measurement result of the source cell while the UE is receiving PWS messages from the source cell) while/before the UE is deciding to handover to the target cell. To achieve the same effect, in some other implementations, a negative offset value may be configured to the UE and the UE may add a DL-RSRP offset value (e.g., a negative value) to the original DL-RSRP measurement result of the target cell (while the UE is receiving PWS messages from the source cell) while/before the UE is deciding to handover to the target cell. Both of the aforementioned approaches may enable the UE to postpone the (conditional) handover procedure to the target cell (e.g., before the UE was able to assemble the valid PWS-SIB, such as SIB6/SIB7/SIB8).

It should be noted that the above-mentioned mechanisms may also be applied to a cell (re)selection procedure. It should also be noted that, in some implementations, the described mechanisms may be applicable (only) when the selected SNPN does not support the PWS message delivery (e.g., a 3GPP Release-16 SNPN). In some implementations, the described mechanisms may not be applicable when the selected SNPN supports the PWS message delivery (e.g., a 3GPP Release-17 SNPN).

In some implementations, a UE may receive an SNPN selection request from the NAS layer while the UE is triggered to receive PWS messages. In some such implementations, the UE may keep monitoring the PWS messages without being impacted by the SNPN selection request. The UE may then trigger the SNPN selection procedure (only) after the UE has received the PWS message (e.g., via SIB6/SIB7/SIB8) from its serving cell successfully. The UE may then forward the received PWS messages to the NAS layer and start the SNPN selection procedure accordingly. In some implementations, when a UE receives an SNPN selection request from the NAS layer while the UE is triggered to receive PWS messages, the UE may drop the stored/received SIBs (e.g., which include PWS messages) that are related to the PWS (e.g., based on the NAS instruction/configuration) (e.g., by referring to the selected/registered SNPN after receiving the SNPN selection request).

In some implementations, the cell supporting at least one SNPN may broadcast SIB6 which may indicate the primary notification of the ETWS, SIB7 including the secondary notification of the ETWS, and SIB8 including the warning notification of the CMAS. It should be noted that the content in SIB6 broadcast by the cell supporting at least one SNPN may be different from the content in SIB6 broadcast by the cell supporting at least one PLMN. Similarly, the content in SIB7 broadcast by the cell supporting at least one SNPN may be different from the content in SIB7 broadcast by the cell supporting at least one PLMN. Additionally, the content in SIB8 broadcast by the cell supporting at least one SNPN may be different from the content in SIB8 broadcast by the cell supporting at least one PLMN. In some implementations, the format of the IEs and/or the content of the IEs in SIB6, SIB7, and SIB8 broadcast by the cell supporting at least one SNPN may include the legacy format of the IEs and/or the legacy content of the IEs in SIB6, SIB7 and SIB8 broadcast by a (legacy) cell that supports at least one PLMN, and further the SNPN-specific format of the IEs and/or the SNPN-specific content of the IEs in SIB6, SIB7, and SIB8. In some implementations, an extension field as shown below in Table 5 may be used.

TABLE 5

```
SIB6 ::= SEQUENCE {
messageIdentifier          BIT STRING (SIZE(16)),
serialNumber               BIT STRING (SIZE(16)),
waringType                 OCTET STRING (SIZE(2)),
LateNonCriticalExtention.  OCTET STRING  OPTIONAL,
[[ SNPN-specific primary notification of the ETWS ]],
}
```

TABLE 5-continued

```
SIB6 ::= SEQUENCE {
messageIdentifier          BIT STRING (SIZE(16)),
serialNumber               BIT STRING (SIZE(16)),
waringType                 OCTET STRING (SIZE(2)),
LateNonCriticalExtention   OCTET STRING  (CONTAINING SNPN-
specific primary notification of the ETWS),
}
```

An SNPN-specific primary notification of the ETWS may include the format of IEs and/or content of IEs, such as the message identifier to identify the source and type of ETWS notification in the SNPN, the serial number to identify variations of an ETWS notification in the SNPN, and the warning type to identify the warning type of the ETWS primary notification and provide information on emergency user alert and UE popup in the SNPN, as shown below in Table 6.

TABLE 6

```
SIB7 ::= SEQUENCE {
messageIdentifier          BIT STRING (SIZE(16)),
serialNumber               BIT STRING (SIZE(16)),
warningMessageSegmentType  ENUMERATED {notLastSegment, lastSegment},
warningMessageSegmentNumber INTEGER (0..63),
warningMessageSegment      OCTET STRING,
dataCodingScheme           OCTET STRING (SIZE (1))
    OPTIONAL, -- Cond Segment 1
LateNonCriticalExtention
  [[ SNPN-specific secondary notification of the ETWS ]];
}
SIB7 ::= SEQUENCE {
messageIdentifier          BIT STRING (SIZE(16)),
serialNumber               BIT STRING (SIZE(16)),
warningMessageSegmentType  ENUMERATED {notLastSegment, lastSegment},
warningMessageSegmentNumber INTEGER (0..63),
warningMessageSegment      OCTET STRING,
dataCodingScheme           OCTET STRING (SIZE (1))
    OPTIONAL, -- Cond Segment 1
LateNonCriticalExtention   OCTET STRING (CONTAINING SNPN-
specific secondary notification of the ETWS),
}
```

In some implementations, the SNPN-specific secondary notification of the ETWS may include the format of IEs and/or content of IEs, such as the message identifier to identify the source and type of ETWS notification in the SNPN, the serial number to identify variation of an ETWS notification in the SNPN, the warning message segment type to indicate whether the included ETWS warning message in the SNPN is the last segment or not, the warning message segment number to indicate a segment number of the ETWS warning message segment in the SNPN contained in the SIB (e.g., where a segment number of zero corresponds to the first segment, a segment number of one corresponds to the second segment, and so on), the warning message segment to carry a segment of the warning message contents IE in SNPN, and the data coding scheme to identify the alphabet/coding and the language applied variation of an ETWS notification in SNPN, as shown in Table 7 below.

TABLE 7

```
SIB8 ::= SEQUENCE {
messageIdentifier          BIT STRING (SIZE(16)),
serialNumber               BIT STRING (SIZE(16)),
warningMessageSegmentType  ENUMERATED {notLastSegment, lastSegment},
warningMessageSegmentNumber INTEGER (0..63),
warningMessageSegment      OCTET STRING,
dataCodingScheme           OCTET STRING (SIZE (1))
    OPTIONAL, -- Cond Segment 1
warningAreaCoordinatesSegment  OCTET STRING         OPTIONAL, --
Need R
LateNonCriticalExtention
  [[ SNPN-specific warning notification of the CMAS ]];
}
SIB8 ::= SEQUENCE {
messageIdentifier          BIT STRING (SIZE(16)),
serialNumber               BIT STRING (SIZE(16)),
warningMessageSegmentType  ENUMERATED {notLastSegment, lastSegment},
warningMessageSegmentNumber INTEGER (0..63),
```

TABLE 7-continued

| | |
|---|---|
| warningMessageSegment | OCTET STRING, |
| dataCodingScheme | OCTET STRING (SIZE (1)) |
| OPTIONAL, -- Cond Segment 1 | |
| warningAreaCoordinatesSegment | OCTET STRING        OPTIONAL, -- |
| Need R | |
| LateNonCriticalExtention | OCTET STRING (CONTAINING SNPN- |
| specific | |
| warning notification of the CMAS), | |
| } | |

In some implementations, the SNPN-specific warning notification of the CMAS may include the format of IEs and/or content of IEs such as the message identifier to identify the source and type of CMAS notification in SNPN, the serial number to identify variation of a CMAS notification in SNPN, the warning message segment type to indicate whether the included CMAS warning message in SNPN is the last segment or not, the warning message segment number to indicate a segment number of the CMAS warning message segment in SNPN contained in the SIB (e.g., where a segment number of zero corresponds to the first segment, a segment number of one corresponds to the second segment, and so on), the warning message segment to carry a segment of the warning message contents IE in SNPN, the data coding scheme to identify the alphabet/coding and the language applied variation of a CMAS notification in SNPN, and the warning area coordinates segment in SNPN.

In some implementations, if the warning area coordinates segment in SNPN is present, it may carry a segment, with one or more octets, of the geographical area where the CMAS warning message is valid. In some other implementations, if the warning area coordinates are provided for the warning message in SNPN, the warning message segment number may apply to both warning message segment and warning area coordinates segment. In some additional implementations, if the warning area coordinates are provided for the warning message in SNPN, the warning message segment type may apply to both warning message segment and warning area coordinates segment.

In some implementations, a UE with selected or registered SNPN may acquire SIB6 for the primary notification of the ETWS, acquire SIB7 for the secondary notification of the ETWS, and/or acquire SIB8 for the warning notification of the CMAS. Specifically, an ETWS-capable UE with one selected or registered SNPN may acquire SIB6 for the primary notification of the ETWS, acquire SIB7 for the secondary notification of the ETWS. A CMAS-capable UE with one selected or registered SNPN may acquire SIB8 for the warning notification of the CMAS. Such a UE may support 3GPP Release 17 and/or beyond. That is, a UE with selected or registered SNPN, but supporting 3GPP Release 16 and/or prior, may not acquire SIB6 for the primary notification of the ETWS, may not acquire SIB7 for the secondary notification of the ETWS, and/or may not acquire SIB8 for the warning notification of the CMAS. The UE that supports previous 3GPP releases may ignore (or may not decode) SNPN-specific primary notification of the ETWS in SIB6, SNPN-specific secondary notification of the ETWS in SIB7 and SNPN-specific warning notification of the CMAS in SIB8, if it receives SIB6, SIB7 and SIB8, respectively.

In some implementations, a UE camping on the cell supporting at least one SNPN may acquire SIB6 for the SNPN-specific primary notification of the ETWS, acquire SIB7 for the SNPN-specific secondary notification of the ETWS, and/or acquire SIB8 for the SNPN-specific warning notification of the CMAS. For example, the UE may camp on the cell supporting at least one SNPN as an acceptable cell. The UE may not have selected or registered SNPN. The UE may or may not have selected or registered PLMN. The UE may support 3GPP Release 17 and/or beyond.

In some implementations, the first system information block may correspond to SIB6, the second system information block may correspond to SIB7, and the third system information block correspond to SIB8.

In some implementations, the fourth system information block may correspond to SIB6, where the integrated notifications of the ETWS exclude the secondary notification of the ETWS. That is, the ETWS in SNPN may not support the secondary notification of the ETWS. The fifth system information block may correspond to SIB8.

In some implementations, the format of the IEs and/or the content of the IEs in SIB6, SIB7, and SIB8 broadcast by the cell supporting at least one SNPN may include an SNPN-specific indicator, respectively, to indicate whether the information in SIB6, SIB7 and SIB8 is applied for the SNPN, whether the information in SIB6, SIB7 and SIB8 is applied for the PLMN, and/or whether the information in SIB6, SIB7 and SIB8 is applied for both SNPN and PLMN.

In some implementations, the SNPN-specific indicator may include a format of ENUMERATED {snpn}. For example, 'snpn' or the presence of the SNPN-specific indicator may represent that the information in SIB6, SIB7, and SIB8 are applicable for the UE in SNPN Access Mode (AM) (e.g., if the UE supports 3GPP Release 17 and/or beyond), for the UE with registered or selected SNPN (e.g., if the UE supports 3GPP Release 17 and/or beyond) and/or for the SNPN network. The absence of the SNPN-specific indicator may represent that the information in SIB6, SIB7 and SIB8 are applicable for the UE that is not in SNPN AM.

In some implementations, if the indicator is present or include 'snpn', the UE with registered or selected SNPN may read and apply the information in SIB6, SIB7, and SIB8. If the indicator is absent, the UE with registered or selected SNPN may not read nor apply the information in SIB6, SIB7, and SIB8. If the indicator is absent, the UE with registered or selected SNPN may ignore the information in SIB6, SIB7, and SIB8. If the indicator is absent, the UE with registered or selected SNPN may read, but may not apply the information in SIB6, SIB7, and SIB8. For example, if the indicator is absent, (the AS layer of) the UE with registered or selected SNPN may not forward the information in SIB6 (e.g., warningType, messageIdentifier, serialNumber, SNPN-specific primary notification of the ETWS) to upper layers (e.g., the NAS layer of the UE). For example, if the indicator is absent, (the AS layer of) the UE with registered or selected SNPN may not forward the information in SIB7 (e.g., warning message, messageIdentifier, serialNumber, dataCodingScheme, SNPN-specific secondary notification of the ETWS) to upper layers (e.g., the NAS layer of the UE). For example, if the indicator is absent, (the AS layer of)

the UE with registered or selected SNPN may not forward the information in SIB8 (e.g., warning message, messageIdentifier, serialNumber, dataCodingScheme, geographical area coordinates, SNPN-specific warning notification of the CMAS) to upper layers (e.g., the NAS layer of the UE). The UE with registered. or selected SNPN may camp on or be served by the cell.

In some implementations, if the indicator is present or include 'snpn', the UE with registered or selected SNPN and supporting 3GPP Release 17 and/or beyond may read and apply the information in SIB6, SIB7, and SIB8. If the indicator is absent, the UE with registered or selected SNPN and supporting 3GPP Release 17 and/or beyond may not read nor apply the information in SIB6, SIB7, and SIB8. If the indicator is absent, the UE with registered or selected SNPN and supporting 3GPP Release 17 and/or beyond may ignore the information in SIB6, SIB7, and SIB8. If the indicator is absent, the UE with registered or selected SNPN and supporting 3GPP Release 17 and/or beyond may read but may not apply the information in SIB6, SIB7 and SIB8. For example, if the indicator is absent, (the AS layer of) the UE with registered or selected SNPN and supporting 3GPP Release 17 and/or beyond may not forward the information in SIB6 (e.g., warningType, messageIdentifier, serialNumber, SNPN-specific primary notification of the ETWS) to upper layers (e.g., the NAS layer of the UE). For example, if the indicator is absent, (the AS layer of) the UE with registered or selected SNPN and supporting 3GPP Release 17 and/or beyond may not forward the information in SIB7 (e.g., warning message, messageIdentifier, serialNumber, dataCodingScheme, SNPN-specific secondary notification of the ETWS) to upper layers (e.g., the NAS layer of the UE). For example, if the indicator is absent, (the AS layer of) the UE with registered or selected SNPN and supporting 3GPP Release 17 and/or beyond may not forward the information in SIB8 (e.g., warning message, messageIdentifier, serialNumber, dataCodingScheme, geographical area coordinates, SNPN-specific warning notification of the CMAS) to upper layers (e.g., the NAS layer of the UE). The UE with registered or selected SNPN and supporting 3GPP Release 17 and/or beyond may camp on or be served by the cell.

In some implementations, if the indicator is present, the UE supporting 3GPP Release 17 and/or beyond may read and apply the information in SIB6, SIB7, and SIB8. If the indicator is present, the UE supporting 3GPP Release 17 and/or beyond may ignore (e.g., may not read) the information in SIB6, SIB7, and SIB8. If the indicator is present, the UE supporting 3GPP Release 17 and/or beyond may read, but may not apply the information in SIB6, SIB7, and SIB8.

In some implementations, the UE supporting 3GPP Release 17 and/or beyond may not operate in SNPN AM (Access Mode). That is, the UE supporting 3GPP Release 17 and/or beyond may (or may not) have a selected PLMN or a registered PLMN. For example, if the indicator is absent, (the AS layer of) the UE supporting 3GPP Release 17 and/or beyond may not forward the information in SIB6 (e.g., warningType, messageIdentifier, serialNumber, SNPN-specific primary notification of the ETWS) to upper layers (e.g., the NAS layer of the UE). For example, if the indicator is absent, (the AS layer of) the UE supporting 3GPP Release 17 and/or beyond may not forward the information in SIB7 (e.g., warning message, messageIdentifier, serialNumber, dataCodingScheme, SNPN-specific secondary notification of the ETWS) to upper layers (e.g., the NAS layer of the UE). For example, if the indicator is absent, (the AS layer of) the UE supporting 3GPP Release 17 and/or beyond may not forward the information in SIB8 (e.g., warning message, messageIdentifier, serialNumber, dataCodingScheme, geographical area coordinates, SNPN-specific warning notification of the CMAS) to upper layers (e.g., the NAS layer of the UE). The UE supporting 3GPP Release 17 and/or beyond may operate in SNPN AM, but may not yet have a selected SNPN or a registered SNPN.

In some implementations, the SNPN-specific indicator may be a format of ENUMERATED {snpn, plmn}. For example, 'snpn' may represent that the information in SIB6, SIB7, and SIB8 are applicable for the UE in SNPN AM (e.g., if the UE supports 3GPP Release 17 and/or beyond), for the UE with registered or selected SNPN (e.g., if the UE supports 3GPP Release 17 and/or beyond) and/or for the SNPN network. If the indicator is 'plmn' or absent, it may represent that the information in SIB6, SIB7, and SIB8 are applicable for the UE that is not in SNPN AM.

In some implementations, if the indicator includes 'snpn', the UE with registered or selected SNPN may read and apply the information in SIB6, SIB7 and SIB8. If the indicator is 'plmn' or absent, the UE with registered or selected SNPN may not read nor apply the information in SIB6, SIB7 and SIBS. If the indicator is 'plmn' or absent, the UE with registered or selected SNPN may ignore the information in SIB6, SIB7 and SIB8. If the indicator is 'plmn' or absent, the UE with registered or selected SNPN may read, but may not apply the information in SIB6, SIB7 and SIB8. For example, if the indicator is 'plmn' or absent, (the AS layer of) the UE with registered or selected SNPN may not forward the information in SIB6 (e.g., warningType, messageIdentifier, serialNumber, SNPN-specific primary notification of the ETWS) to upper layers (e.g., the NAS layer of the UE). For example, if the indicator is 'plmn' or absent, (the AS layer of) the UE with registered or selected SNPN may not forward the information in SIB7 (e.g., warning message, messageIdentifier, serialNumber, dataCodingScheme, SNPN-specific secondary notification of the ETWS) to upper layers (e.g., the NAS layer of the UE). For example, if the indicator is 'plmn' or absent, (the AS layer of) the UE with registered or selected SNPN may not forward the information in SIB8 (e.g., warning message, messageIdentifier, serialNumber, dataCodingScheme, geographical area coordinates, SNPN-specific warning notification of the CMAS) to upper layers (e.g., the NAS layer of the UE). The UE with registered or selected SNPN may camp on or be served by the cell.

In some implementations, if the indicator is 'snpn', the UE with registered or selected SNPN and supporting 3GPP Release 17 and/or beyond may read and apply the information in SIB6, SIB7 and SIB8. If the indicator is absent or 'plmn', the UE with registered or selected SNPN and supporting 3GPP Release 17 and/or beyond may not read nor apply the information in SIB6, SIB7 and SIB8. If the indicator is absent or 'plmn', the UE with registered or selected SNPN and supporting 3GPP Release 17 and/or beyond may ignore the information in SIB6, SIB7 and SIB8. If the indicator is absent or 'plmn', the UE with registered or selected SNPN and supporting 3GPP Release 17 and/or beyond may read but may not apply the information in SIB6, SIB7 and SIB8. For example, if the indicator is 'plmn' or absent, (the AS layer of) the UE with registered or selected SNPN and supporting 3GPP Release 17 and/or beyond may not forward the information in SIB6 (e.g., warningType, messageIdentifier, serialNumber, SNPN-specific primary notification of the ETWS) to upper layers (e.g., the NAS layer of the UE).

For example, if the indicator is 'plmn' or absent, (the AS layer of) the UE with registered or selected SNPN and supporting 3GPP Release 17 and/or beyond may not forward the information in SIB7 (e.g., warning message, messageIdentifier, serialNumber, dataCodingScheme, SNPN-specific secondary notification of the ETWS) to upper layers (e.g., the NAS layer of the UE). For example, if the indicator is 'plmn' or absent, (the AS layer of) the UE with registered or selected SNPN and supporting 3GPP Release 17 and/or beyond may not forward the information in SIB8 (e.g., warning message, messageIdentifier, serialNumber, dataCodingScheme, geographical area coordinates, SNPN-specific warning notification of the CMAS) to upper layers (e.g., the NAS layer of the UE). The UE with registered or selected SNPN and supporting 3GPP Release 17 and/or beyond may camp on or be served by the cell.

In some implementations, if the indicator is 'plmn', the UE supporting 3GPP Release 17 and/or beyond may read and apply the information in SIB6, SIB7 and SIB8. If the indicator is absent or 'snpn', the UE supporting 3GPP Release 17 and/or beyond may ignore (i.e., may not read) the information in SIB6, SIB7 and SIB8. If the indicator is absent or snpn, the UE supporting 3GPP Release 17 and/or beyond may read but may not apply the information in SIB6, SIB7 and SIB8. If the indicator is absent or 'snpn', the UE supporting 3GPP Release 17 and/or beyond may not read nor apply the information in SIB6, SIB7 and SIB8.

For example, if the indicator is 'snpn' or absent, (the AS layer of) the UE supporting 3GPP Release 17 and/or beyond may not forward the information in SIB6 (e.g., warningType, messageIdentifier, serialNumber, SNPN-specific primary notification of the ETWS) to upper layers (e.g., the NAS layer of the UE). For example, if the indicator is 'snpn' or absent, (the AS layer of) the UE supporting 3GPP Release 17 and/or beyond may not forward the information in SIB7 (e.g., warning message, messageIdentifier, serialNumber, dataCodingScheme, SNPN-specific secondary notification of the ETWS) to upper layers (e.g., the NAS layer of the UE). For example, if the indicator is 'snpn' or absent, (the AS layer of) the UE supporting 3GPP Release 17 and/or beyond may not forward the information in SIB8 (e.g., warning message, messageIdentifier, serialNumber, dataCodingScheme, geographical area coordinates, SNPN-specific warning notification of the CMAS) to upper layers (e.g., the NAS layer of the UE).

In some implementations, the UE supporting 3GPP Release 17 and/or beyond may not operate in SNPN AM (Access Mode). That is, the UE supporting 3GPP Release 17 and/or beyond may (or may not) have a selected PLMN or a registered PLMN. In some other implementations, the UE supporting 3GPP Release 17 and/or beyond may operate in SNPN AM but may not yet have a selected SNPN or a registered SNPN.

As described above, in some implementations, a UE may monitor the incoming PWS messages and depending on how the UE is configured (e.g., depending on the configuration received from a higher layer of the UE, from a serving cell, etc.) the UE may determine to pass the received PWS messages to the higher layer (e.g., after decoding the messages) or, alternatively, to ignore the received (e.g., and decoded) PWS messages (e.g., by referring to the selected/registered SNPN after receiving the SNPN selection request).

Figure 3:
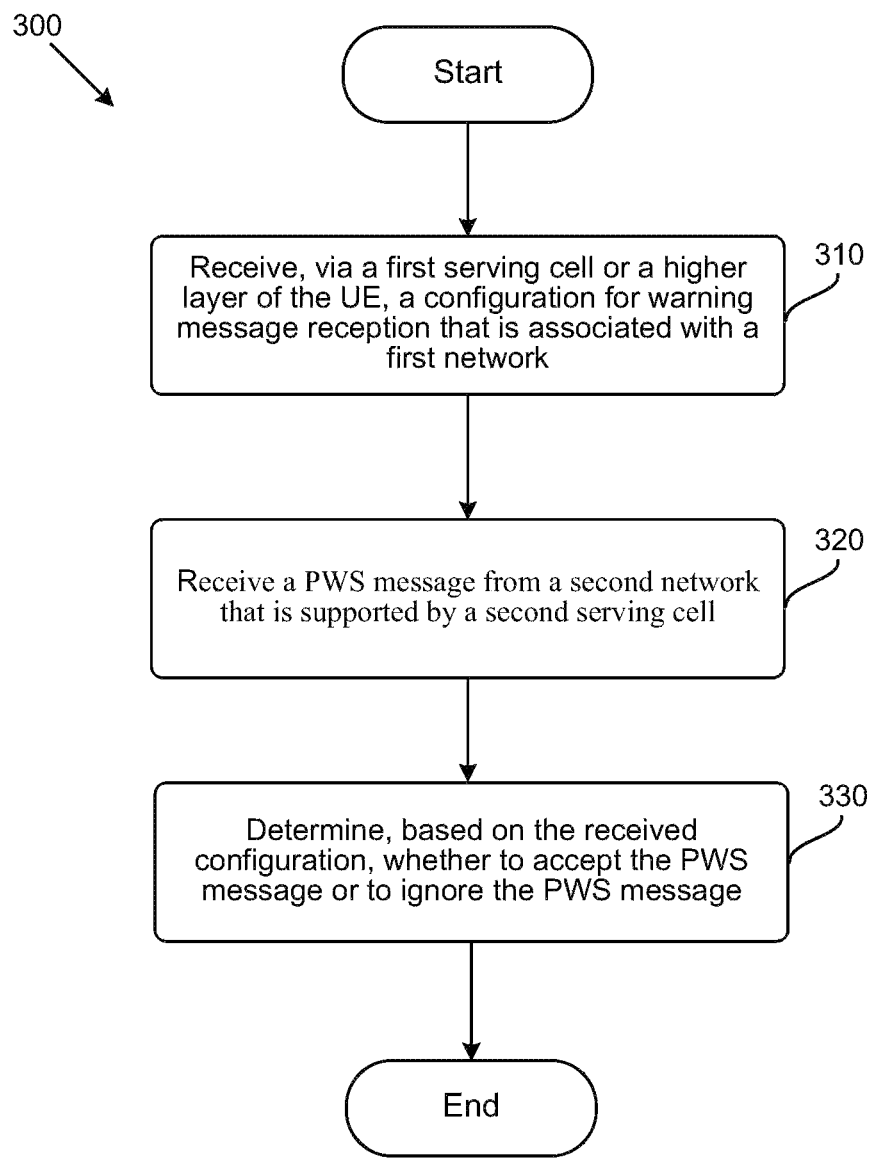
FIG. 3 is a flowchart illustrating a method/process performed by a UE to determine whether to accept or ignore a PWS message, according to an example implementation of the present application.

FIG. 3 is a flowchart illustrating a method/process 300 performed by a UE to determine whether to accept or ignore a PWS message, according to an example implementation of the present application. As shown in FIG. 3, process 300 may start by receiving, at 310, via a first serving cell or a higher layer of the UE, a configuration for warning message reception that is associated with a first network.

Process 300 may then receive, at 320, a PWS message from a second network that is supported by a second serving cell. The process may then determine, at 330, based on the received configuration, whether to accept the PWS message or to ignore the PWS message. In some implementations, the UE may accept the PWS message by forwarding the PWS message to the upper layers (e.g., from NAS layer to application/service layer). In some implementations, the UE may decide to ignore the PWS messages in the NAS layer (e.g., after receiving the PWS messages in the AS layer).

In some implementations, the first and second serving cells may be the same (e.g., cell 120, as shown in FIG. 1). In some implementations, the first network may be a public land mobile network (PLMN) and the second network may be an SNPN. That is, a UE may receive configuration for PWS message reception associated with a PLMN. The UE may then receive a PWS message from an SNPN. It should be noted that in some implementations, the serving cell of the UE may support RAN sharing and the UE may be capable of connecting or being associated with (e.g., being registered/subscribed with, having been selected, etc.) multiple networks. In some implementations, after the UE receives the PWS message (e.g., by a lower layer of the UE), the UE may either pass the PWS message to the higher layers of the UE (e.g., after decoding the message), or may ignore the PWS message. In some implementations, the UE may make this decision based on the PWS configuration it has received previously (e.g., from the higher, such as NAS layers of the UE, or from a serving cell).

In some implementations, the first network may be either of a PLMN or an SNPN and the second network may also be either of an SNPN or a PLMN. In some implementations, the first serving cell may include a Universal Mobile Telecommunications System (UMTS) Subscriber Identity Module (USIM) and the higher layer may include a serving RAN of the UE.

As described above, in some earlier releases of 3GPP (e.g., 3GPP Release-16), SNPN may (optionally) not support a PWS/emergency service. Additionally, a UE operating under an SNPN access mode may camp on an acceptable cell that may not support the PWS/emergency service. In some implementations, such a selected cell/SNPN may not support emergency services while it supports the PWS (e.g., CMAS and/or ETWS). In some other implementations, such a selected cell/SNPN may not support the PWS while it supports emergency services.

The definition of an acceptable cell may be different from the selected SNPN/registered SNPN in different implementations. For example, in some implementations, an SNPN (e.g., SNPN #a) may support both emergency services and PWS. As such, cells that support SNPN #a (e.g., under a RAN sharing scenario) may also support both emergency services and the PWS. Under such a condition, the cell that is associated with SNPN #a (e.g., SNPN #a's serving cell) may also support both emergency services and the PWS.

In some implementations, an SNPN (e.g., SNPN #b) may support emergency (call) services but does not support PWS. In some such implementations, cells which support SNPN #b (e.g., under a RAN sharing scenario) may also support emergency services but may not support PWS. Under such a condition, the cell that is associated with SNPN #b may also support emergency services but not the PWS.

In some implementations, an SNPN (e.g., SNPN #c) may support PWS but does not support emergency services. In some such implementations, cells that support SNPN #c (e.g., under a RAN sharing scenario) may also support PWS but may not support emergency services. Under such a condition, the cell that is associated with SNPN #c may also support PWS but not the emergency services.

Therefore, while the UE is searching for an "acceptable cell" for limited services, the UE may obtain different limited services, which may depend on the selected/observed SNPNs during a cell (re)selection procedure. For example, based on the SNPNs described in the above examples (e.g., SNPN #a, SNPN #b, SNPN #c), a UE may be able to access emergency and PWS while the UE selects SNPN #a and an "acceptable cell" associated with SNPN #a. For such a UE, the "limited services" may include both PWS and emergency services.

As another example, a UE may only be able to access emergency services (e.g., without availability of PWS) while the UE selects SNPN #b and an "acceptable cell" associated with the SNPN #b. For such a UE, the "limited services" (or the limited services state) may only include the emergency services. As a third example, a UE may only be able to access the PWS (without availability of the emergency services) while the UE selects SNPN #c and an "acceptable cell" associated with the SNPN #c. For such a UE, the "limited services" (or the limited services state) may only include the emergency services.

In some implementations, a UE may give (or be given) different priorities to different types of acceptable cells (and/or different priorities to different SNPNs). In some such implementations, the different types of acceptable cells may be decided based on the type of "limited services" that the acceptable cell may support for the UE, such as Type_A: Emergency and PWS, Type_B: PWS only, and Type_C: Emergency services only.

It should be noted that during a neighboring cell detection, a UE may detect neighboring Type_A and/or Type_B and/or type_C cells, as described above, which may fulfill specific requirements for a cell (re)selection procedure. For example, those candidate cells for cell (re)selection procedure may fulfill S-criteria (e.g., according to 3GPP TS 38.304 specification).

In some implementations, the UE may give Type_A cell(s) (and the associated SNPN #a) the highest priority during an SNPN selection procedure and a cell (re)selection procedure, while the UE is staying in a "camped on any cell" state (e.g., in comparison with the Type_B cell(s)/SNPN #b and Type_C cell(s)/SNPN #c). This may represent that the UE may prefer to select Type_A cells/SNPN #a, rather than Typc_B/SNPN #b and Type_C cells/SNPN #c, during the SNPN selection (and the cell (re)selection) procedure.

In some implementations, the UE may give Type_B cell(s) (and the associated SNPN #b) a second priority during the SNPN selection procedure and the cell (re)selection procedure, while the UE is staying in the "camped on any cell" state (e.g., in comparison with the Type_A cell(s)/SNPN #a and Type_C cell(s)/SNPN #c). This may represent that the UE prefers to select Type_B cells/SNPN #b, rather than Type_C cells/SNPN #c, during the SNPN selection and cell (re)selection procedures (and when the Type_A cell(s)/SNPN #a is absent during the neighboring cell detection under such a scenario). The UE may, however, still tend to select Type_A cells, rather than Type_B cells, if any qualified Type_A cell (e.g., based on the S-criteria) is detected.

In some implementations, the UE may give Type_C cell(s) (and the associated SNPN #c) a second priority during the SNPN and cell (re)selection procedures, while the UE is staying in the "camped on any cell" state (e.g., in comparison with the Type_A cell(s)/SNPN #a and Type_B cell(s)/SNPN #b). This may represent that the UE prefers to select Type_C cells/SNPN #c, rather than Type_B cells/SNPN #b, during the SNPN selection and cell (re)selection procedures (and when the Type_A cell(s)/SNPN #a is absent during the neighboring cell detection under such a scenario). The UE may, however, still tend to select Type_A cells, rather than Type_C cells, if any qualified Type_A cells (e.g., based on the S-criteria) is detected.

In some implementations, a UE may give Type_B cell(s) (and the associated SNPN #b) the last (or lowest) priority during the SNPN and cell (re)selection procedures, while the UE is staying "camped on any cell" state (e.g., in comparison with the Type_A cell(s)/SNPN #a and Type_C cell(s)/SNPN #c). This may represent that the UE may select Type_B cells/SNPN #b only when Type_A cell(s)/SNPN #a and Type_C cell(s)/SNPN #c are absent during a neighboring cell detection). The UE may, however, still tend to select Type_A cells/SNPN #a or Type_C cells/SNPN #c, rather than Type_B cells if any qualified Type_A cells/SNPN #a or Type_C cells/SNPN #c (e.g., based on the S-criteria) is detected.

In some implementations, a UE may give Type_C cell(s) (and the associated SNPN #c) the last (or lowest) priority during the SNPN and cell (re)selection procedures, while the UE is staying "camped on any cell" state (e.g., in comparison with the Type_A cell(s)/SNPN #a and Type_B cell(s)/SNPN #b). This may represent that the UE may select Type_C cells/SNPN #c only when the Type_A cell(s)/SNPN #a and Type_C cell(s)/SNPN #c are absent during the neighboring cell detection). The UE may, however, still tend to select Type_A cells/SNPN #a or Type_B cells/SNPN #b, rather than Type_C cells if any qualified Type_A cells/SNPN #a or Type_B cells/SNPN #b (e.g., based on the S-criteria) is detected.

In some implementations, the UE may release/delete the priority for different cells once the UE camps on a cell (e.g., a suitable cell, an acceptable cell, etc.). Based on what is described above a UE may search for "available cells" based on the assigned priorities (e.g., the UE may find the first priority cells, then the second priority cells, and so on). In some implementations, the priority rules may be preconfigured (e.g., in a memory module of the UE). In some other implementations, the priority rules may be transmitted to the UE, for example, by a serving RAN via broadcasting (cell-specific) system information or via UE-specific RRC signaling (e.g., an RRCReconfiguration message or an RRCRelease message). In some implementations, the priority rules may be predefined (e.g., according to the 3GPP technical specifications). In some other implementations, the priority rules may be transmitted to the UE as NAS signaling (e.g., via the forwarding of a serving RAN).

In some implementations, the UE may apply the proposed priority rules only while the UE staying in the SNPN access mode. In some implementations, the UE may apply the described priority rules when the UE has selected (or registered with) an SNPN (e.g., a Release-17 SNPN). In contrast, the UE may not apply the priority rules when the UE moves out of the SNPN access mode, or the UE has selected (or registered with) an SNPN. In some implementations, the priority rules may be associated with the priorities of the SNPN, which may be transmitted by the NAS layer.

In some implementations, the UE may find neighboring cells that support both earlier versions of SNPN (e.g., 3GPP Release-16 SNPN) (e.g., SNPN #A) and newer versions of SNPN (e.g., 3GPP Release-17 SNPN) (e.g., SNPN #B) when the UE searches for "acceptable cells" (e.g., the UE is operating in "Camped on Any Cell" state). In some implementations, the UE may select cells that support SNPN #B, rather than SNPN #A, if the cells associated with SNPN #B support emergency services. In some other implementations, the UE may select cells that support SNPN #B, rather than SNPN #A, if the cells associated with SNPN #B support Public Warning Services. In some other implementations, the UE may select cells that support SNPN #B, rather than SNPN #A, if the cells associated with SNPN #B support Public Warning Services & emergency (call) services.

As described above, in earlier 3GPP specifications (e.g., in Release-16), a UE that is enabled to access an SNPN (e.g., an SNPN enabled UE) may be configured to operate in an SNPN access mode (e.g., to activate the SNPN access mode) or not to operate in the SNPN access mode (e.g., to deactivate the SNPN access mode). For a UE that is operating in the SNPN access mode, the UE may implement an SNPN selection (e.g., and the following cell selection/reselection procedures based on the selected/registered SNPN) to camp on a (suitable) cell. For a UE that is not operating in the SNPN access mode, the UE may implement a PLMN selection (e.g., and the following cell selection/reselection procedures based on the selected/registered PLMN) to camp on a (suitable) cell. In some implementations, the details of activation and deactivation of the SNPN access mode (e.g., for an SNPN enabled UE) may be up to the UE implementation (e.g., the UE may change SNPN access mode based on the instructions received from the NAS layer of the UE or via dedicated control signaling transmitted by the NAS layer on the CN side). From Access Stratum's point of view, the Non-Access Stratum may decide to switch the SNPN access mode (e.g., activate/deactivate the SNPN access mode) and forward the decision to the AS layer of the UE. The AS layer in the UE may then be triggered to implement the SNPN selection (e.g., when the NAS layer activates the deactivated SNPN access mode) or to implement the PLMN selection (e.g., when the NAS layer deactivates the activated SNPN access mode).

In some implementations, a UE (e.g., the NAS layer of the UE) may send a request to indicate its preferred network/NW access mode (e.g., the UE may inform the serving NW that it prefers the SNPN Access Mode being activated or deactivated by transmitting a NW preference request) to the (UE's serving/registered) network (e.g., the NAS layer of the CN). In some additional implementations, the UE may store the preferred network access mode (or the NW preference request) in the UE.

However, in some implementations, the UE may delete the stored NW preference request/preferred network access mode when a PLMN selection or SNPN selection is performed based on the request by the NAS layer in the UE (e.g., after a manual operation implemented by a user or after receiving a NW access mode switch instruction from the UE's serving NW).

In some implementations, a UE (e.g., the NAS layer of the UE) may receive a (frequency) prioritization/de-prioritization request to prioritize/de-prioritize one or more frequency carriers during cell (re)selection procedure. In some additional implementations, the UE may receive the frequency prioritization/de-prioritization request via broadcasting system information or UE-specific control signaling (e.g., RRCRelease message, which instructs the UE to move to RRC Inactive/Idle state). Then, the UE may store the frequency prioritization/de-prioritization request and implement cell (re)selection procedure based on the stored information.

In a case that the UE receives an RRC Release message with a (frequency) de-prioritization request, the UE may consider the current (DL) frequency (e.g., current DL operation frequency of the serving cell) and stored frequencies set due to a previously received RRC Release message with a de-prioritization request or may consider all the frequencies of the NR-RAT to be the lowest priority frequency (e.g., lower than any of the network configured values) while a timer (e.g., T325) is running, irrespective of the camped RAT. The UE may delete the stored (frequency) de-prioritization request(s) when a PLMN selection or SNPN selection is performed on the request by the NAS layer (e.g., according to the 3GPP TS 23.122). It should be noted that the UE may search for a higher priority layer for cell reselection as soon as possible (e.g., after the change of priority).

In some implementations, a UE may delete the priorities (e.g., the priorities associated with one or more frequency carriers for cell (re)selection procedure) that are provided through dedicated signaling when the UE enters a different RRC state, the optional validity time of dedicated priorities (e.g., T320) expires, or a PLMN selection or SNPN selection is performed on the request by the NAS layer.

In some implementations, the UE may not consider any black/blocked cells (e.g., cells that are blocked/ignored by the UE during the UE's cell (re)selection procedure) as candidate for cell reselection. Additionally, a UE that is in an RRC_IDLE state may inherit the priorities provided through dedicated signaling and the remaining validity time (e.g., T320 in NR and E-UTRA), if configured, during an inter-RAT cell (re)selection.

It should also be noted that the above (and below) described mechanisms may be equally applicable to a condition where an SNPN access mode is changed from "activated" to "deactivated" (e.g., and therefore, the AS layer of the UE may start implementing the PLMN selection). In addition, in some implementations, the UE may be configured with a "PLMN access mode." Such a PLMN access mode may be activated or deactivated by the upper layers (e.g., the NAS layer). The UE may be triggered to implement a PLMN selection if the UE's PLMN access mode is activated. In contrast, the UE may be triggered to implement an SNPN selection (or other kinds of Network selection) if the PLMN access mode is deactivated. It should also be noted that the described embodiments may not be limited to the scope of SNPN and may be equally applicable to other Public Network Integrated NPNs (PNI-NPNs), such as a Closed Access Group (CAG) network.

In some implementations, once an RRC Release message is received at the UE to transition to an RRC_IDLE state or an RRC_INACTIVE state, the UE may attempt to camp on a suitable cell according to a parameter, such as the redirectedCarrierInfo, if the parameter is included in the RRC Release message. If the UE cannot find a suitable cell, the UE may be allowed to camp on any suitable cell of the indicated RAT. If the RRC Release message does not contain the specific parameter (e.g., redirectedCarrierInfo) the UE may attempt to select a suitable cell on an NR carrier. If no suitable cell is found through any of the above-described mechanisms, the UE may perform a cell (re)selection procedure, for example, using its stored information in order to find a suitable cell to camp on. The UE may remove the stored parameter (e.g., redirectedCarrierInfo) provided by the RRC Release message and/or may stop reporting the received cnType to the upper layers when a PLMN selection or SNPN selection is performed on the request by the NAS layer (e.g., according to the 3GPP TS 23.122).

In some implementations, when returning to an RRC_IDLE state (e.g., after the UE has moved to an RRC_CONNECTED state from camped on any cell state), the UE may attempt to camp on an acceptable cell according to a specific parameter (e.g., the redirectedCarrierInfo parameter) if the parameter is included in the RRC Release message. If the UE cannot find an acceptable cell, the UE may be allowed to camp on any acceptable cell of the indicated RAT. If the RRC Release message does not contain the parameter (e.g., redirectedCarrierInfo) or the stored parameter, redirectedCarrierInfo, is removed when a PLMN selection or SNPN selection is performed on the request by the NAS layer, the UE may attempt to select an acceptable cell on an NR frequency. In addition, the UE may stop reporting the available CN Type(s) or the received cnType to the upper layers when a PLMN selection or SNPN selection is performed on the request by the NAS layer. If no acceptable cell is found according to the above-described methods, the UE may continue searching for an acceptable cell of any PLMN while in an any cell selection state.

It should be noted that, in some implementations, the stored redirectedCarrierInfo information may further include one indicator to indicate a target RAT which the UE should implement while the UE tries to find a (suitable) cell on the re-directed carrier. For example, if the UE is indicated by the E-UTRA/NR, as the target RAT in the redirectedCarrierInfo, then the UE may start to find a cell (e.g., an E-UTRA/NR cell) on the re-directed carrier based on the indicated target RAT. In some implementations, if an NW access mode is changed (e.g., the UE switches its NW access mode to SNPN access mode or switches its NW access mode out of SNPN access mode), the UE may be requested to implement the SNPN selection or PLMN selection due to the change, or the UE may abort/stop the cell (re)selection procedure which is triggered after receiving the RRC Release message, which may include the parameter redirectedCarrierInfo indicating the redirection to a target EUTRA/NR RAT.

In some additional implementations, the UE may also delete the stored parameter redirectedCarrierInfo (or the UE may stop the reporting of available CN Type(s) or reporting of the received cnType to the upper layers) when a PLMN selection (or SNPN selection) is performed on the request by the NAS layer.

In some implementations, an LTE UE (e.g., the UE that camps on an E-UTRAN or the UE that is served by an E-UTRAN) may keep the parameter redirectedCarrierInfo in case the E-UTRAN connected to 5GC also supports the SNPN. In some implementations, the SNPN may also be implemented by the E-UTRA cells and base stations in E-UTRAN.

In some implementations, when the SNPN access mode is changed (e.g., a PLMN selection or SNPN selection is performed on the request by the NAS layer), the UE may delete the stored parameter redirectedCarrierInfo based on the target RAT of the redirectedCarrierInfo (e.g., UE may delete the redirectedCarrierInfo only when the redirectedCarrierInfo is indicating the EUTRA or other RATs besides NR), or the UE may delete the stored redirectedCarrierInfo irrelevant of the target RAT; the UE may treat the received redirectedCarrierInfo as part of the stored information, in which case, if no suitable cell is found after the change, the UE may perform cell selection using the stored redirectedCarrierInfo in order to find a suitable cell to camp on; or the UE may keep the redirectedCarrierInfo even if the SNPN access mode has been modified by the NAS layer (e.g., since the SNPN may also be supported and be realized through E-UTRA). In some implementations, the NAS layer may transmit explicit signaling to the AS layer of the UE to further indicate whether (and/or which) stored information (e.g., redirectedCarrierInfo or other priorities stored at the UE prior to the SNPN access mode is changed) is still applicable when the NAS layer requests the AS layer to implement the SNPN selection or the PLMN selection (e.g., due to the SNPN access mode change).

In some implementations, (absolute) priorities of different NR frequencies or inter-RAT frequencies may be provided to the UE in the system information (e.g., in the RRCRelease message) or by inheriting from another RAT during an inter-RAT cell (re)selection. In the case of system information, an NR frequency or inter-RAT frequency may be listed without providing a priority (e.g., the field cellReselectionPriority is absent for that frequency). If priorities are provided in dedicated signaling, the UE may ignore all the priorities provided in the system information. If the UE is in a camped on any cell state, the UE may only apply the priorities provided by the current cell through system information, and the UE may preserve the priorities provided through dedicated signaling and the de-prioritization request received in RRC Release message, unless specified otherwise. When the UE is in a camped normally state and has only the dedicated priorities (other than for the current frequency), the UE may consider the current frequency to be the lowest priority frequency (e.g., lower than any of the network configured values). Additionally, the UE may only perform cell reselection evaluation for NR frequencies and inter-RAT frequencies that are given in system information and for which the UE has a priority provided.

In some implementations, when the UE receives an RRC Release (RRCRelease) message with a (frequency) de-prioritization request (e.g., the parameter deprioritisationReq), the UE may consider the current frequency and stored frequencies due to the previously received RRCRelease message with deprioritisationReq or all the frequencies of NR to be the lowest priority frequency (e.g., lower than any of the network configured values) while a timer (e.g., T325) is running, irrespective of the camped RAT. The UE may delete the stored de-prioritization request(s) when a PLMN selection or SNPN selection is performed on the request by the NAS layer (e.g., according to 3GPP TS 23.122).

In some implementations, the UE may delete priorities provided by dedicated signaling when the UE enters a different RRC state, or when the optional validity time of dedicated priorities (T320) expires, or when a PLMN selection or SNPN selection is performed on the request by the NAS layer. In some implementations, the UE may not consider any black cells (e.g., cells which is blocked by the UE for cell (re)selection procedure) as candidate for cell reselection. In some implementations, a UE in an RRC_IDLE state may inherit the priorities provided by dedicated signaling and the remaining validity time (e.g., T320 in NR and E-UTRA), if configured, at an inter-RAT cell (re)selection.

In some implementations, the network may assign dedicated cell reselection priorities for frequencies that are not configured by the system information. In the LTE RRC Idle/Inactive state, a UE may delete the priorities provided through dedicated signaling when the UE enters a different LTE RRC state; or the optional validity time of dedicated priorities (e.g., timer T320) expires; or a PLMN selection or SNPN selection is performed on the request by the NAS layer.

In some implementations, the UE may inherit the priorities provided by dedicated signaling and the remaining validity time (e.g., T320 in E-UTRA and NR, T322 in UTRA and T3230 in GERAN), if configured, at an inter-RAT cell (re)selection. The UE in an (LTE) RRC_IDLE state may release the priorities provided by dedicated signaling from other RATs (e.g., NR) and the remaining validity time (e.g., T320 in NR) when the UE is requested to perform a PLMN selection or SNPN selection on the request by the NAS layer.

In some implementations, the UE in NR RRC_IDLE/RRC_INACTIVE state may inherit the priorities provided by dedicated signaling and the remaining validity time (e.g., T320 in NR and E-UTRA), if configured, at an inter-RAT cell (re)selection. The UE in an (NR) RRC_IDLE/INACTIVE state may release the priorities provided by (LTE) dedicated signaling and the remaining validity time (e.g., T320 in E-UTRA) when the UE is requested to perform a PLMN selection or SNPN selection on the request by the NAS layer.

In some implementations, the network may assign dedicated cell reselection priorities for the frequencies that are not configured by the system information. In some implementations, if SNPN Access Mode is changed in the NAS layer, (1) the AS layer of the UE may be requested to implement the SNPN selection or PLMN selection, or (2) the UE may stop the cell (re)selection procedure which is triggered after receiving the RRCRelease message, or (3) the UE may delete the stored cellReselectionPriority when a PLMN selection (or SNPN selection) procedure is performed on the request by the NAS layer, or (4) the UE may stop counting the timer (LTE/NR) T320 and/or may release the timer (e.g., before/after the inter-RAT cell (re)selection procedure, such as when the UE transitions from an LTE RRC idle state to an NR RRC idle state or from the NR RRC idle state to the LTE RRC idle state). The above-described implementations may be applicable to an inter-RAT cell reselection scenario as well (e.g., the UE may discard the cell reselection priority information provided by the cellReselectionPriorities or inherited from another RAT, for example, when the UE receives a cellReselectionPriorities parameter in an RRCConnectionRelease message transmitted by an E-UTRAN cell).

In some implementations, if the SNPN access mode is changed, for a UE that is in an RRC Inactive state, the UE may (1) be requested to implement the SNPN selection or PLMN selection, (2) release/stop the running cell (re)selection procedure (which is triggered after receiving the RRCRelease message with suspendConfig, (3) release/stop the running RAN Notification Area Update (RNAU) procedure, (4) release the stored UE Inactive AS Context (such as the ran notification area), (5) transition to an (NR) RRC idle state after being indicated that the SNPN access mode is changed, (6) delete the stored suspendConfig when a PLMN selection (or SNPN selection) is performed on the request by the NAS layer. In addition, the counting timer, such as T380/T302/T390 (if there is any) may also be stopped and/or be released with the SNPN Access Mode change. Moreover, in some implementations, the UE may need not to report the RRC Connection release to the NAS layer.

In some implementations, a UE that is in RRC inactive state may not be impacted by the SNPN access mode change. For example, the counting T380/T302/T390 may not be stopped/released with the SNPN access mode change.

The UE may stay in the RRC inactive state even when the SNPN access mode is changed (e.g., a PLMN selection or SNPN selection is performed on the request by the NAS layer). For example, the UE may stay in the RRC inactive state while the UE is moving in the cellular network shared by a PLMN(s) and an SNPN(s). In some additional implementations, the NW may further indicate in which SNPN(s) the UE is authorized to stay in the RRC inactive state. In some additional implementations, the NAS layer of the UE my indicate the selected SNPN to the AS layer with further indication to request the UE to stay in the RRC inactive state (e.g., while the UE is implementing a cell (re)selection procedure based on the SNPN identity indicated by the NAS layer of the UE). In the suspendConfig, the UE may be provided with the SNPN identities (and additional cell identities associated with the SNPN identities) from which the UE is allowed to select while the UE is still staying in the RRC inactive state (e.g., the cells may be shared by the PLMN(s) and SNPN(s) to which the UE is allowed to access).

In some implementations, the RAN Notification Area may also include the cells or tracking area codes or ran notification area code (ranac) that are associated with one or more SNPNs to which the UE may be authorized to access. Also, an SNPN identifier may include one PLMN identifier and one Network Identifier. In some additional implementations, the cell identity/tracking area code/ranac associated with one or more PLMNs or the cell identity/tracking area code/ranac associated with one or more SNPNs may be configured jointly in one RAN Notification Area configuration configured to the UE through dedicated control signaling (e.g., an RRCRelease message). Then, the UE may stay in the RRC inactive state while the UE is moving within the given RNA, otherwise, the UE may be initiated to implement an RNA update procedure if the UE moves out of the given RNA.

In some implementations, the stored suspendConfig may still be kept by the UE after the UE performs an SNPN selection procedure on the request of the NAS layer. In some implementations, part of the suspendConfig may be associated with the SNPN (e.g., being associated with some specific SNPN identities or associated with the "activated" SNPN access mode). As such, after the SNPN access mode is activated, only the part of suspendConfig that is associated with the SNPN may be kept by the UE and the other parts of suspendConfig may be released after the UE starts to implement the SNPN selection procedure. It should be noted that the above (and below) described implementations may also be applicable to PLMNs (e.g., part of the suspendConfig may be associated with a PLMN that is associated with some specific PLMN identities or associated with the "deactivated" SNPN access mode). As such, after the SNPN access mode is deactivated, only the part of suspendConfig that is associated with the PLMN may be kept and the other parts of suspendConfig may be released after the UE starts to implement the PLMN selection procedure.

In some implementations, if a cell is treated as if the cell status is "barred" due to being unable to acquire SIB1 or due to trackingAreaCode associated with the selected (registered) PLMN/SNPN being absent in SIB1 (e.g., as specified in 3GPP TS 38.331), the UE may exclude the barred cell as a candidate for cell selection/reselection for up to a particular duration (e.g., 200 seconds, 300 seconds, etc.). Additionally, the stored barred cell's information (and the associated counting timer to consider that a cell is barred) may be released when the SNPN access mode is changed (or when the UE starts to implement the PLMN selection procedure/ SNPN selection procedure due to the change of the SNPN access mode).

Additionally, in some implementations, the NPN identities used to define the SNPN may cover a particular information element, such as the NPN-IdentityInfoList information element shown in Table 1 below.

TABLE 8

-- ASN1START
-- TAG-NPN-IDENTITYINFOLIST-START
NPN-IdentityInfoList-r16 ::= SEQUENCE (SIZE (1..maxNPN-r16)) OF NPN-IdentityInfo-r16
NPN-IdentityInfo-r16 ::=        SEQUENCE {
  npn-IdentityList-r16            SEQUENCE (SIZE (1..maxNPN-r16)) OF NPN-Identity-r16,
  trackingAreaCode-r16            TrackingAreaCode,
  ranac-r16                       RAN-AreaCode   OPTIONAL, -- Need R
  cellIdentity-r16                CellIdentity,
  cellReservedForOperatorUse-r16     ENUMERATED {reserved, notReserved},
  ...
}
-- TAG-NPN-IDENTITYINFOLIST-STOP
-- ASN1STOP
NPN-IdentityInfoList field descriptions:
NPN-IdentityInfo
The NPN-IdentityInfo contains one or more NPN identities and additional information associated with those NPNs. Only the same type of NPNs (either SNPNs or PNI-NPNs) may be listed in an NPN-IdentityInfo element.
npn-IdentityList
The npn-IdentityList contains one or more NPN Identity elements.
trackingAreaCode
Indicates the Tracking Area Code to which the cell indicated by cellIdentity field belongs.
ranac
Indicates the RAN Area Code to which the cell indicated by cellIdentity field belongs.
trackingAreaCode
Indicates Tracking Area Code to which the cell indicated by cellIdentity field belongs.
cellReservedForOperatorUse
Indicates whether the cell is reserved for operator use (for the NPN(s) identified in the npn-IdentyList) as defined in TS 38.304.

In some implementations, the trackingAreaCode may be optional in the configuration. Moreover, the trackingAreaCode and/or the ranac in the NPN-identityInfoList may also be part of the RAN Notification Area for a UE (e.g., being provided to the UE through an RRCRlease message or other dedicated control signaling) when an SNPN(s) (or an NPN(s)) is also configured as the UE's RAN Notification Area.

In some implementations, an SNPN enabled UE may stay in an (LTE) RRC Idle or an (LTE) RRC inactive state, when the SNPN access mode is deactivated). Below, with reference to FIG. 4, the RRC state transitions of a UE is described.

Figure 4:
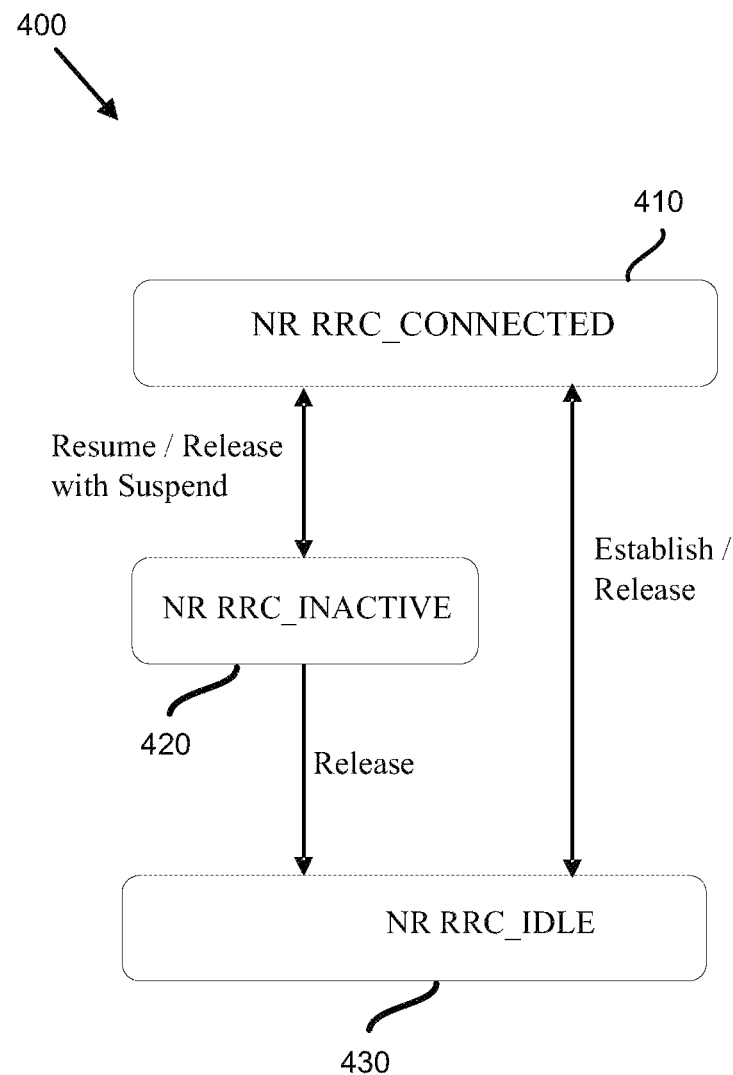
FIG. 4 is an RRC state transition diagram illustrating various RRC states and RRC transition procedures that a UE may undergo within a radio access network, according to an example implementation of the present application.

FIG. 4 is an RRC state transition diagram 400 illustrating various RRC states and RRC transition procedures that a UE may undergo within a radio access network, according to an example implementation of the present application. The RRC state transition diagram 400 may include RRC_CONNECTED state 410, RRC_INACTIVE state 420, and RRC_IDLE state 430.

In some implementations, the RRC Connected, RRC Inactive, and RRC Idle states may be three RRC states independent of one another. As shown in FIG. 4, a UE may transition among the three RRC states. The proposed mechanism may be applied to the UE during a target SIB reception procedure independent of the UE's RRC state (e.g., RRC_CONNECTED state, RRC_INACTIVE state, and RRC_IDLE state). In addition, the proposed mechanisms may also be applicable to UEs that are not impacted by the state transitions between the RRC states.

For example, a UE may transition to RRC_INACTIVE state 420 from RRC_CONNECTED state 410 or may transition from RRC_INACTIVE state 420 to any of RRC_CONNECTED state 410 or RRC_IDLE state 430. However, as shown in RRC state transition diagram 400, a UE may not transition directly from RRC Idle state 430 to RRC Inactive state 420 in some implementations. That is, a UE may transition to RRC Inactive state 420 from RRC Idle state 430 through RRC Connected state 410 in some such implementations. In some aspects of the present implementations, a UE may also transition from RRC Connected state 410 to RRC Inactive state 420 using an RRC Suspend (or RRC Release with Suspend (configuration)) procedure. Conversely, the UE may transition from RRC Inactive state 420 to RRC Connected state 410 using an RRC (Connection) Resume procedure. Additionally, the UE may use an RRC Release procedure to transition from RRC Connected state 410 to RRC Inactive state 420 or RRC Idle state 430, while using an RRC Establish procedure to transition from RRC Idle state 430 to RRC Connected state 410.

In some implementations, in an RRC_INACTIVE state, a UE may remain as Connection Management (CM)-CONNECTED (e.g., where the UE has signaling connection with AMF) and may move within an area configured by the NG-RAN (e.g., RNA) without notifying the NG-RAN. In the RRC_INACTIVE state, the last serving cell (e.g., associated with a gNB) and the UE itself may keep the UE context (e.g., the UE (Inactive) Access Stratum (AS) context of the UE) and the UE-associated NG connection with the serving AMF and UPF.

In some implementations, the RRC_INACTIVE state may support various functions and/or characteristics, such as, small data transmission (SDT), PLMN selection, SNPN selection, broadcast of system information, cell re-selection mobility, paging initiated by NG-RAN (RAN paging), RAN-based notification area (RNA) managed by NG-RAN, DRX for RAN paging configured by NG-RAN, 5GC-NG-RAN connection (e.g., both control/user (C/U)-planes)

established for the UE, UE AS context stored in NG-RAN and the UE, NG-RAN determining the RNA to which the UE belongs, etc. In some implementations, for NR connected to 5GC network, a UE's identity (e.g., full I-RNTI and/or short I-RNTI) may be used to identify the UE context (and the anchor cell/BS which stores the UE context) in the RRC_INACTIVE state. The I-RNTI may provide the new NG-RAN node with a reference to the UE context corresponding the old NG-RAN node.

In some implementations, an SNPN enabled UE may transition from an LTE RRC Inactive(/Idle) state to an NR Idle state when the SNPN access mode is activated (e.g., by the upper layer of the UE). In addition, from the AS layer's point of view, a UE in LTE RRC Inactive/Idle state may transition to an NR RRC Idle state automatically when the UE is requested by the NAS layer to implement the SNPN selection.

In some implementations, a UE in an LTE RRC inactive state may transition to an NR RRC inactive state when the UE is requested by the NAS layer to implement the SNPN selection. In addition, the stored SuspendConfig may still be valid after the RRC inactive state transition. In some implementations, the UE may also inherit the timers (e.g., T302 or T380 or T390 in the LTE protocols) during the inter-RAT RRC state transitions. In some implementations, the stored SuspendConfig may be released in the inter-RAT RRC state transitions and the active timers, while the UE is staying in the LTE RRC inactive state, may be stopped/released after the UE transitions to the NR RRC inactive state.

In some implementations, private networks (e.g., SNPN) may also be supported in an E-UTRA network. Therefore, a UE in the NR RRC inactive state may transition to the LTE RRC inactive state when the UE is requested by the NAS layer to implement the SNPN selection. In addition, the stored SuspendConfig may still be valid after the RRC inactive state transition. In some implementations, the UE may also inherit the timers (e.g., T302 or T380 or T390 in NR protocols) during the inter-RAT RRC state transitions. In some implementations, the stored SuspendConfig may be released in the inter-RAT RRC state transition and the active timers, while the UE is staying in the NR RRC inactive state, may be stopped/released after the UE transitions to the LTE RRC inactive state.

In some implementations, cell(s) of a shared network may broadcast one or more of the following information (e.g., through system information delivery): one or more Tracking Area Codes (TACs), multiple PLMN identities, multiple SNPN identities, or one or more PLMN identities and one or more SNPN identities. It should be noted that, in some implementations, a PLMN ID may include a combination of a PLMN identifier and a Network Identifier (NID).

Therefore, in some implementations, an SNPN enabled UE may apply the PLMN identity list/SNPN identity list (that it receives from a serving cell) as part of the stored information when the SNPN access mode is changed. For example, when the SNPN access mode is deactivated, the UE may monitor and/or camp on a cell that broadcasts one or more PLMN identities and/or one or more SNPN identities. The UE may then record the SNPN identity list that is broadcast by the cell(s) of the shared network. In contrast, when the SNPN access mode is activated, in some such implementations, the UE may monitor and/or camp on a cell that broadcasts one or more PLMN identities and/or one or more SNPN identities. The UE may then record the PLMN identity list that is broadcast by the cell(s) in the shared network. In some implementations, if the SNPN access mode is changed, the stored information may be applied to facilitate the following PLMN/SNPN selection procedure (and cell (re)selection procedure). That is, the stored SNPN identity list and/or PLMN identity list (e.g., associated with the cells on which the UE has camped) may not be released by the SNPN access mode change.

In some implementations, an SNPN enabled UE for which an SNPN access mode is activated may record the received PLMN identity list from the monitoring results irrespective of whether the monitored cell supports any SNPN or not. Conversely, an SNPN enabled UE for which an SNPN access mode is deactivated may record the received SNPN identity list from the monitoring results irrespective of whether the monitored cell supports any PLMN or not. In some implementations, if the SNPN access mode is changed, the stored information may be applied to facilitate the following PLMN/SNPN selection procedure (and cell (re)selection procedure).

Figure 5:
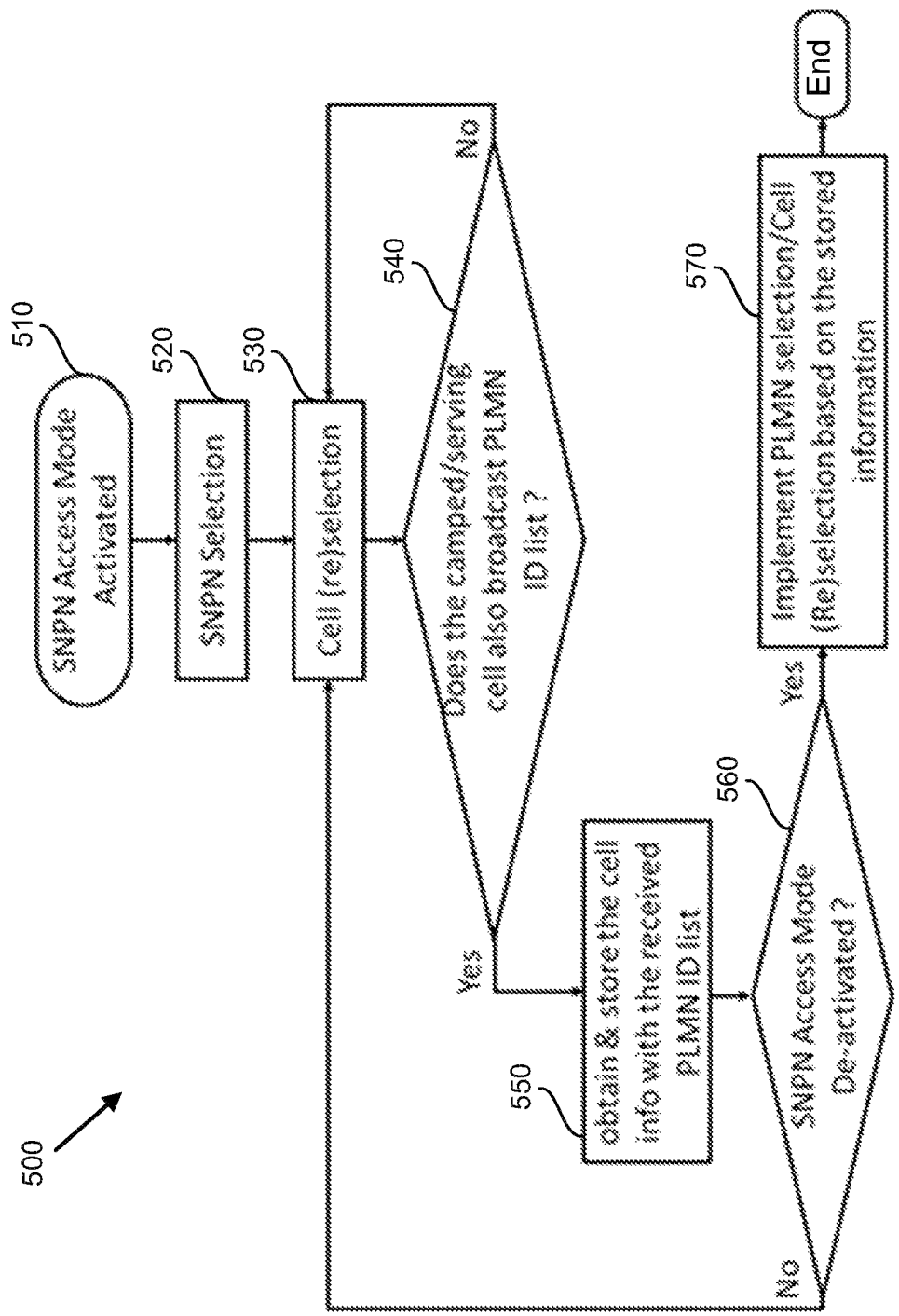
FIG. 5 is a flowchart illustrating a method/process for an SNPN enabled UE to record a PLMN identity list, according to an example implementation of the present application.

FIG. 5 is a flowchart illustrating a method/process 500 for an SNPN enabled UE to record a PLMN identity list, according to an example implementation of the present application. Specifically, FIG. 5 illustrates an SNPN enabled UE to record a PLMN identity list that the UE receives from a shared NW even when the SNPN access mode is activated.

As shown in the figure, process 500 starts at 510 by an SNPN enabled UE for which SNPN access mode is activated. Process 500 may then make, at 520, an SNPN selection. At 530, the process may perform a cell (re) selection.

Process 500 may then determine, at 540, whether the camped/serving cell has broadcast a PLMN ID list. If process 500 determines that no PLMN ID list is broadcast by the camped/serving cell, the process may then return to action 530 to perform a cell (re) selection. On the other hand, if process 500 determines that a PLMN ID list is broadcast by the camped/serving cell, the process may obtain and store, at 550, the cell information with the received PLMN ID list.

Thereafter, process 500 may determine, at 560, whether the SNPN access mode is deactivated. If process 500 determines that the SNPN access mode is not deactivated, the process may then return to action 530 to perform a cell (re) selection. On the other hand, if process 500 determines that that the SNPN access mode is deactivated, the process may then implement a PLMN selection (or cell (re)selection) based on the stored information. The process may then end.

Figure 6:
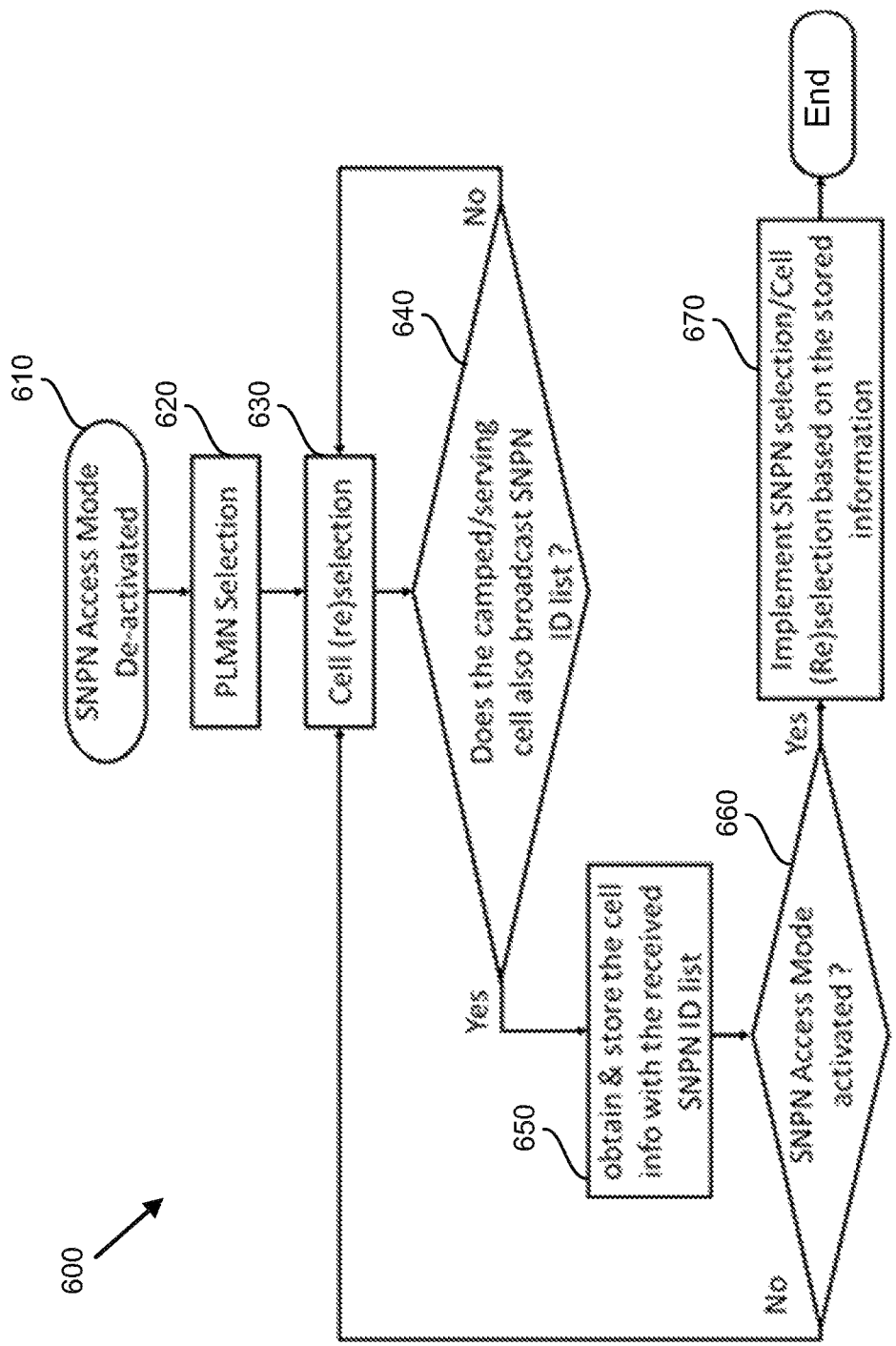
FIG. 6 is a flowchart illustrating a method/process for an SNPN enabled UE to record an SNPN identity list, according to an example implementation of the present application.

FIG. 6 is a flowchart illustrating a method/process 600 for an SNPN enabled UE to record an SNPN identity list, according to an example implementation of the present application. Specifically, FIG. 6 illustrates an SNPN enabled UE to record an SNPN identity list that the UE receives from a shared NW even when the SNPN access mode is deactivated.

As shown in the figure, process 600 starts at 610 by an SNPN enabled UE for which SNPN access mode is deactivated. Process 600 may then make, at 620, a PLMN selection. At 630, the process may perform a cell (re) selection.

Process 600 may then determine, at 640, whether the camped/serving cell has broadcast an SNPN ID list. If process 600 determines that no SNPN ID list is broadcast by the camped/serving cell, the process may then return to action 630 to perform a cell (re) selection. On the other hand, if process 600 determines that an SNPN ID list is broadcast by the camped/serving cell, the process may obtain and store, at 650, the cell information with the received SNPN ID list.

Thereafter, process 600 may determine, at 660, whether the SNPN access mode is activated. If process 600 determines that the SNPN access mode is not activated, the process may then return to action 630 to perform a cell (re) selection. On the other hand, if process 600 determines that that the SNPN access mode is activated, the process may then implement an SNPN selection (or cell (re)selection) based on the stored information. The process may then end.

Figure 7:
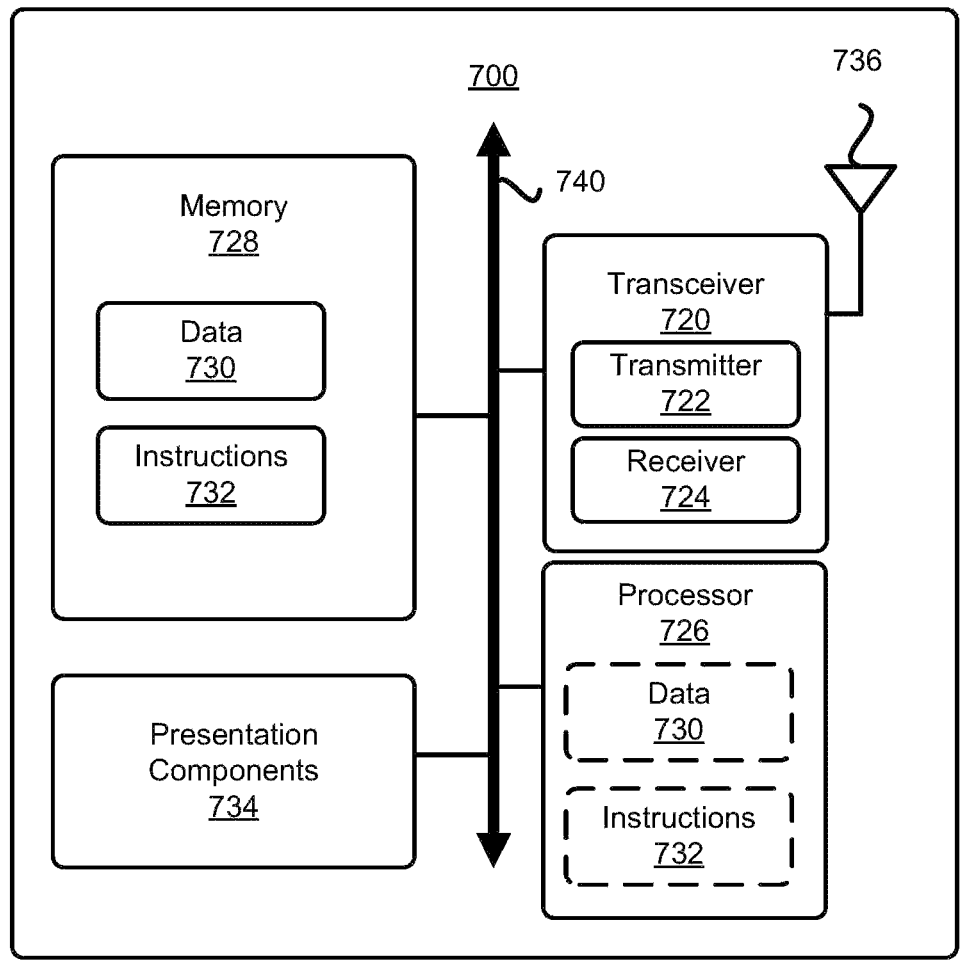
FIG. 7 illustrates a block diagram of a node for wireless communication, according to an example implementation of the present application.

FIG. 7 illustrates a block diagram of a node for wireless communication, according to an example implementation of the present application. As shown in FIG. 7, node 700 may include transceiver 720, processor 726, memory 728, one or more presentation components 734, and at least one antenna 736. Node 700 may also include a Radio Frequency (RF) spectrum band module, a base station communications module, a network communications module, and a system communications management module, input/output (I/O) ports, I/O components, and power supply (not explicitly shown in FIG. 7). Each of these components may be in communication with each other, directly or indirectly, over one or more buses 740.

Transceiver 720 having transmitter 722 and receiver 724 may be configured to transmit and/or receive time and/or frequency resource partitioning information. In some implementations, transceiver 720 may be configured to transmit in different types of subframes and slots including, but not limited to, usable, non-usable and flexibly usable subframes and slot formats. Transceiver 720 may be configured to receive data and control signaling.

Node 700 may include a variety of computer-readable media. Computer-readable media can be any available media that can be accessed by node 700 and include both volatile and non-volatile media, removable and non-removable media. By way of example, and not limitation, computer-readable media may comprise computer storage media and communication media. Computer storage media include both volatile and non-volatile, removable and non-removable media implemented in any method or technology for storage of information such as computer-readable instructions, data structures, program modules or other data.

Computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media do not comprise a propagated data signal. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

Memory 728 may include computer-storage media in the form of volatile and/or non-volatile memory. Memory 728 may be removable, non-removable, or a combination thereof. Exemplary memory includes solid-state memory, hard drives, optical-disc drives, etc. As illustrated in FIG. 7, memory 728 may store computer-readable, computer-executable instructions 732 (e.g., software codes) that are configured to, when executed, cause processor 726 to perform various functions described herein, for example, with reference to FIGS. 1 through 7. Alternatively, instructions 732 may not be directly executable by processor 726 but be configured to cause node 700 (e.g., when compiled and executed) to perform various functions described herein.

Processor 726 may include an intelligent hardware device, for example, a central processing unit (CPU), a microcontroller, an ASIC, etc. Processor 726 may include memory. Processor 726 may process data 730 and instructions 732 received from memory 728, and information through transceiver 720, the base band communications module, and/or the network communications module. Processor 726 may also process information to be sent to transceiver 720 for transmission through antenna 736, to the network communications module for transmission to a core network.

One or more presentation components 734 presents data indications to a person or other device. For example, one or more presentation components 734 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a user equipment (UE) for receiving a public warning system (PWS) message, the method comprising:
   receiving, via a first serving cell or a higher layer of the UE, a configuration for warning message reception that is associated with a first network;
   receiving, by a lower layer of the UE, the PWS message from a second network that is supported by a second serving cell; and
   determining, based on the received configuration, whether to pass the PWS message to the higher layer of the UE or to ignore the PWS message and not passing the PWS message to the higher layer.

2. The method of claim 1, wherein the first network comprises a first standalone non-public network (SNPN) and the second network comprises a second SNPN.

3. The method of claim 1, wherein the first serving cell and the second serving cell are the same.

4. The method of claim 1, wherein the first network comprises a public land mobile network (PLMN) and the second network comprises a standalone non-public network (SNPN).

5. The method of claim 1, wherein the first network comprises a standalone non-public network (SNPN) and the second network comprises a public land mobile network (PLMN).

6. The method of claim 1, wherein the first serving cell comprises a Universal Mobile Telecommunications System (UMTS) Subscriber Identity Module (USIM) and the higher layer comprises a serving Radio Access Network (RAN) of the UE.

7. The method of claim 1, wherein the UE is subscribed to the first network, but is not subscribed to the second network.

8. The method of claim 1, wherein the UE is registered to the first network and has selected the second network.

9. The method of claim 1, wherein the UE is neither registered to the second network nor has selected the second network.

10. A user equipment (UE), comprising:
- one or more non-transitory computer-readable media storing computer-executable instructions for receiving a public warning system (PWS) message; and
- at least one processor coupled to the one or more non-transitory computer-readable media, and configured to execute the computer-executable instructions to:
    - receive, via a first serving cell or a higher layer of the UE, a configuration for warning message reception that is associated with a first network;
    - receive, by a lower layer of the UE, the PWS message from a second network that is supported by a second serving cell; and
    - determine, based on the received configuration, whether to pass the PWS message to the higher layer of the UE or to ignore the PWS message and not passing the PWS message to the higher layer.

11. The UE of claim 10, wherein the first network comprises a first standalone non-public network (SNPN) and the second network comprises a second SNPN.

12. The UE of claim 10, wherein the first serving cell and the second serving cell are the same.

13. The UE of claim 10, wherein the first network comprises a public land mobile network (PLMN) and the second network comprises a standalone non-public network (SNPN).

14. The UE of claim 10, wherein the first network comprises a standalone non-public network (SNPN) and the second network comprises a public land mobile network (PLMN).

15. The UE of claim 10, wherein the first serving cell comprises a Universal Mobile Telecommunications System (UMTS) Subscriber Identity Module (USIM) and the higher layer comprises a serving Radio Access Network (RAN) of the UE.

16. The UE of claim 10, wherein the UE is subscribed to the first network, but is not subscribed to the second network.

17. The UE of claim 10, wherein the UE is registered to the first network and has selected the second network.

18. The UE of claim 10, wherein the UE is neither registered to the second network nor has selected the second network.

* * * * *